United States Patent
Xie et al.

(10) Patent No.: US 10,719,735 B2
(45) Date of Patent: Jul. 21, 2020

(54) INFORMATION PROCESSING METHOD, INFORMATION PROCESSING DEVICE AND VIDEO SURVEILLANCE SYSTEM

(71) Applicant: HITACHI, LTD., Tokyo (JP)

(72) Inventors: Yulai Xie, Beijing (CN); Lu Wu, Beijing (CN); Peng Yang, Beijing (CN)

(73) Assignee: HITACHI, LTD., Tokyo (JP)

( * ) Notice: Subject to any disclaimer, the term of this patent is extended or adjusted under 35 U.S.C. 154(b) by 275 days.

(21) Appl. No.: 15/740,026

(22) PCT Filed: Jun. 29, 2016

(86) PCT No.: PCT/CN2016/087623
§ 371 (c)(1),
(2) Date: Dec. 27, 2017

(87) PCT Pub. No.: WO2017/000880
PCT Pub. Date: Jan. 5, 2017

(65) Prior Publication Data
US 2018/0181836 A1    Jun. 28, 2018

(30) Foreign Application Priority Data
Jun. 29, 2015   (CN) .......................... 2015 1 0368669

(51) Int. Cl.
*G06K 9/00*       (2006.01)
*G06K 9/62*       (2006.01)
*G06K 9/46*       (2006.01)

(52) U.S. Cl.
CPC ....... *G06K 9/6219* (2013.01); *G06K 9/00771* (2013.01); *G06K 9/46* (2013.01);
(Continued)

(58) Field of Classification Search
CPC .... G06K 9/6219; G06K 9/00771; G06K 9/46; G06K 9/623; G06K 9/00268; G06K 2009/00322
(Continued)

(56) References Cited

U.S. PATENT DOCUMENTS 6,584,221 B1 *   6/2003   Moghaddam ....... G06F 16/5838
                                                                     382/165
8,548,255 B2 *   10/2013   Gao ........................ G06K 9/228
                                                                     382/218
(Continued)

FOREIGN PATENT DOCUMENTS

CN          202856897 U      4/2013
CN          103295297 A      9/2013
(Continued)

OTHER PUBLICATIONS

International Search Report of PCT/CN2016/087623 dated Sep. 12, 2016.

*Primary Examiner* — Jonathan S Lee
(74) *Attorney, Agent, or Firm* — Mattingly & Malur, PC

(57) ABSTRACT

An information processing method, apparatus and video surveillance system have expandable functionality. The information processing method has an image acquisition step of acquiring an image; a first party feature quantity extracting step of extracting at least one first party feature quantity for describing a first party feature of the image from the acquired image; a third party feature quantity extracting step of invoking a third party algorithm to extract from the image at least one third party feature quantity for describing a third party feature other than the first party feature of the image; and a feature quantity correlation step of using the link information for describing the correlation between each of the first party feature quantities and each of the third party (Continued)

feature quantities of the same image to correlate each of the first party feature quantities of the image and each of the third party feature quantities.

19 Claims, 11 Drawing Sheets

(52) U.S. Cl.
CPC ......... *G06K 9/623* (2013.01); *G06K 9/00268* (2013.01); *G06K 2009/00322* (2013.01)

(58) Field of Classification Search
USPC .......................................................... 382/225
See application file for complete search history.

(56) References Cited

U.S. PATENT DOCUMENTS

| | | | | |
|---|---|---|---|---|
| 8,861,804 | B1* | 10/2014 | Johnson | G06K 9/00221 382/118 |
| 8,934,670 | B2 | 1/2015 | Feris et al. | |
| 2010/0231721 | A1* | 9/2010 | Meloche | G08G 5/065 348/159 |
| 2011/0244919 | A1* | 10/2011 | Aller | G06K 9/00973 455/556.1 |
| 2012/0263388 | A1 | 10/2012 | Vaddai et al. | |
| 2014/0201219 | A1 | 7/2014 | Kim et al. | |
| 2016/0012310 | A1* | 1/2016 | Kozicki | G02B 21/06 382/218 |
| 2016/0042252 | A1* | 2/2016 | Sawhney | G06F 16/50 382/190 |
| 2016/0378861 | A1* | 12/2016 | Eledath | G06K 9/00718 707/766 |
| 2018/0349792 | A1* | 12/2018 | Zhao | G06K 9/00771 |

FOREIGN PATENT DOCUMENTS

| | | |
|---|---|---|
| CN | 103582884 A | 2/2014 |
| CN | 104094255 A | 10/2014 |
| CN | 104424631 A | 3/2015 |

* cited by examiner

INFORMATION PROCESSING METHOD, INFORMATION PROCESSING DEVICE AND VIDEO SURVEILLANCE SYSTEM

BACKGROUND OF THE INVENTION

Field of the Invention

The present invention relates to an information processing method, an information processing apparatus, and a video surveillance system, and more particularly, to an information processing method and apparatus having expandable functionality, and a video surveillance system using the same.

Description of Related Art

The video surveillance system has been widely used in the city security, traffic monitoring, community management and the like. The deployment of video surveillance system is increasing. Each year, a large number of high definition cameras that meet 720P or 1080P are deployed in cities, and a large number of traditional cameras are replaced with high definition cameras. The video surveillance system generates lots of video data during the day to day operation, and the data is stored for 3 12 months or longer. The accumulation of such video data leads not only to an increased occupation of storage space and network transmission bandwidth, but also to increased difficulty in analysis and management of video content. When it is necessary to find a desired target (such as a person, a vehicle, unknown luggage, etc.) in massive video data, a lot of time is wasted in manual search and it is hard to guarantee the accuracy of manual search, e.g. due to fatigue. On the other hand, the effective management (such as classification, statistics, etc.) of massive video data is also very difficult.

In recent years, some large scale intelligent video surveillance systems gradually have come into use. Compared to the traditional camera with the video recorder mode, the intelligent video surveillance system uses image analysis technology to analyze the video image data, extract, for sensitive features (such as the front of the vehicle, the person's face, etc.), the corresponding feature values (e.g. vectors, numerals, characters, etc.) and store them in the feature library. Therefore, the main part of the retrieval of video content and the management work becomes automatic check of the amount of features by the computer, thereby greatly improving the efficiency and accuracy.

The workflow of the intelligent video surveillance system is mainly divided into two steps. One of the steps is feature quantity registration. The feature quantity registration is a process in which the video image is processed by the image analysis technique, and the feature quantity is extracted into the feature library after the feature quantity is extracted. The feature quantity registration is usually performed during the online operation of the video surveillance system to which cameras access in real time, or during the offline operation of the system into which historical video data is loaded without being accessed by cameras. The feature quantity registration is an operation for constructing a feature library. The other step is the feature quantity comparison. The feature quantity comparison is a process of comparing the feature quantity of the target to be retrieved or its qualification condition with the feature quantity in the feature library of the system, and then returning the feature quantity comparison with the condition. The feature quantity comparison is generally performed when the users of the video surveillance system need to carry out video retrieval or video management. The feature quantity comparison is an operation for using the feature library.

Some of the related patent documents have disclosed intelligent video surveillance systems or analysis systems. For example, in CN201310176223, CN201220360326, U.S. Pat. No. 8,934,670 or the like, it is disclosed that the intelligent video surveillance systems for analyzing human face or moving objects are used in security, emergency warning and other fields.

BRIEF SUMMARY

Technical Problems to be Solved by the Invention

In the conventional intelligent video surveillance system as described above, there is a drawback that a single feature is analyzable and the expandability is lower. For example, some systems can only monitor human faces. Because a target object often has multiple features, description of a target by a single feature will be more one sided and lack of accuracy, and description of the same object by multiple features can increase the accuracy. For example, for a target person, the system described above cannot function when the facial features are deliberately hidden. Facial features along with other features (such as age, gender, clothing color, whether to wear masks, sunglasses, etc.) can better describe a target person. These multiple features also make video content management more flexible (such as video content by sex or age), and video retrieval conditions more custom (such as searching for persons in red, wearing a mask in the video library).

In addition, the related art video surveillance system, which can only analyze a single feature, lacks expandability and is not conducive to cost control. For example, a set of video surveillance system can only be used for face monitoring and can not be used for vehicle monitoring, and in order to monitor the vehicle, it is necessary to reconstruct a system, which will result in wasteful duplication of effort.

It is therefore an object of the present invention to provide an information processing method, an information processing apparatus, and an intelligent video surveillance system using the same, which have expandable functionality, to expand the applicable range of the intelligent video surveillance system, to improve retrieval accuracy, and to enhance the flexibility of video content management, and the customizability of the retrieval.

Technical Solution

In order to solve the above mentioned problems, that is, to expand the functionality of the intelligent video surveillance system, to improve the retrieval accuracy of the intelligent video surveillance system, and to enhance the flexibility of the video content management and the customizability of the retrieval, the present invention provides a information processing method and information processing apparatus to which a third party algorithm (image analysis technology) is accessible by integrating (accessing) the third party algorithm into conventional intelligent video surveillance system, thereby achieving the functionality which cannot be achieved by the algorithm installed in the conventional intelligent surveillance system itself (built-in algorithm) to expand the usability of the system, improve the accuracy of video retrieval and to enhance the flexibility of video management.

For purposes of description, some definitions are made herein. The image herein refers to image data such as videos, pictures, static images, dynamic images, and the like. The first party feature refers to a feature which is extractable from the same image by the intelligent video surveillance system by analyzing the image using the built-in algorithm. The third party feature refers to a feature which is not extractable by using the built-in algorithm but by using a third party algorithm. Third party algorithm refers to an algorithm not installed in the intelligent video surveillance system (non built-in algorithm). The first party feature quantity is a feature quantity that describes a first party feature. The third party feature quantity is a feature that describes a third party feature.

The link information refers to information for describing the correlation between each of the first party feature quantities and the third party feature quantities of the same image, e.g., identifiers for other feature quantities recorded in the first party or third party feature quantities as described hereinafter. The identifier for each feature quantity is unique. The identifier may be a numeral. As used herein, "correlating a first party feature quantity and a third party feature quantity of the same image" includes correlating one first party feature quantity of the same image with one third party feature quantity of the image; correlating a plurality of first party feature quantities of the same image with one another; correlating a plurality of third party feature quantities of the same image with one another; correlating a plurality of first party feature quantities of the same image with a plurality of third party feature quantities of the image; and the like.

According to a first aspect of the present invention, provided is an information processing method, comprising: an image acquisition step of acquiring an image; a first party feature quantity extracting step of extracting at least one first party feature quantity for describing a first party feature of the image from the acquired image; a third party feature quantity extracting step of invoking a third party algorithm to extract from the image at least one third party feature quantity for describing a third party feature other than the first party feature of the image; and a feature quantity correlation step of using the link information for describing the correlation between each of the first party feature quantities and each of the third party feature quantities of the same image to correlate each of the first party feature quantities of the image and each of the third party feature quantities.

According to the information processing method as described above, by means of the integration (or access) of the third party algorithm into the video surveillance system, the function which cannot be achieved by the built-in algorithm of the surveillance system can be achieved. Thus, the surveillance system can extract not only the first party features extractable by the built-in algorithm of the surveillance system but also the third party features by the third party algorithm. In this way, the system can analyze more features, thereby expanding the use of video surveillance system and enhancing the flexibility of video management.

In the second aspect of the present invention, the information processing method according to the first aspect is characterized in that the feature quantity correlation step comprises: assigning a unique identifier for each of the first party feature quantities to the first party feature quantity; assigning a unique identifier for each of the third party feature quantities to the third party feature quantity; recording each of the unique identifiers of the first party feature quantities as link information into other first party feature quantities and other third party feature quantities; recording each of the unique identifiers of the third party feature quantities as link information into other third party feature quantities and the first party feature quantities; and correlating each of the first party feature quantities of the image and each of the third party feature quantities using the link information consisting of the unique identifiers.

According to a third aspect of the present invention, the information processing method according to the first aspect, further comprises: a retrieval step of retrieving the at least one first party feature quantity or the at least one third party feature quantity based on a user's retrieval condition and returning the retrieval result to the user In this way, it is possible to retrieve the first party feature quantity and the third party feature quantity, and thus the retrieval is conducted with more feature quantities, thereby improving the retrieval accuracy of the video surveillance system.

In the fourth aspect of the present invention, the information processing method according to the third aspect is characterized in that the retrieval step comprises: when the retrieval condition targets for a first party feature quantity, retrieving the first party feature quantity to obtain a retrieval result of a first party feature described by the first party feature quantity; searching for corresponding third party feature quantities and corresponding first party feature quantities other than the first feature quantity for which the retrieval condition targets, using the link information; and returning, to the user, the retrieval result of a first party feature described by the first party feature quantity, along with information on third party feature described by each of the third party feature quantity and information on first party feature described by the first party feature quantities other than the first feature quantity for which the retrieval condition targets.

In the fifth aspect of the present invention, the information processing method according to the third aspect is characterized in that the retrieval step comprises: when the retrieval condition targets for a third party feature quantity, retrieving the third party feature quantity to obtain a retrieval result of a third party feature described by the third party feature quantity; searching for corresponding first party feature quantities and corresponding third party feature quantities other than the third feature quantity for which the retrieval condition targets, using the link information; and returning, to the user, the retrieval result of a third party feature described by the third party feature quantity, along with information on first party feature described by each of the first party feature quantity and information on third party feature described by the third party feature quantities other than the third feature quantity for which the retrieval condition targets.

In this way, when the search is performed, the retrieval result is returned to the user together with the information on the corresponding related feature searched by the link information, thereby further improving the accuracy of the video retrieval and improving the flexibility of the video management.

In a sixth aspect of the present invention, the information processing method according to any one of the first to fifth aspects is characterized by further comprising: a first party feature quantity registration step of registering each of the first party feature quantities; and a third party feature quantity registration step of registering each of the third party feature quantities.

In this way, by registering the first party feature quantity and the third party feature quantity separately, the flexibility in registration management can be improved.

In a seventh aspect of the present invention, the information processing method according to the sixth aspect is characterized in that the first party feature quantity registration step and the third party feature quantity registration step includes an online registration mode and an offline registration mode.

Herein, the online registration mode is used to cope with the real time access of the image data and the offline mode is used to cope with the case where the history image data is imported by offline upload. Accordingly, it is possible to not only extract the feature quantity from the image and register it in real time, but also to extract the feature quantity and register by uploading the image offline. Therefore, the video surveillance system can deal with real time monitoring, off line analysis and other needs of different situations.

In the eighth aspect of the present invention, the information processing method according to the sixth aspect is characterized in that in the third party feature quantity registration step, each of the third party feature quantities is stored in a manner of hierarchically clustering approximate feature quantities.

In this way, the third party feature quantities are not arranged in the order of being registered in the storage space, but are arranged in a similarity degree between the feature quantities to form a set of approximate feature quantities. The center vector of the each set of the approximate feature quantities is stored in the first layer storage, When a new feature quantity is registered into the storage space or compared with the feature quantity in the storage space, the most approximate center vector of the set of the approximate feature quantities is searched in the first layer storage and the approximate feature quantity is then searched while entering the corresponding set of feature sets in the second layer. In this way, most of the comparison with a non similar feature vector can be excluded, thereby increasing the retrieval speed.

According to a ninth aspect of the present invention, the information processing method according to any one of the first to fifth aspects further comprises: a feature quantity format conversion step of converting the format of each of the third party feature quantities obtained by the third party algorithm into a format compatible with the format of each of the first party feature quantities.

In this way, the extracted third party feature quantity is compatible with the first party feature quantity in format, thereby facilitating the unified management of the feature quantity.

In a tenth aspect of the present invention, the information processing method according to any one of the first to fifth aspects is characterized in that the first party feature quantity is any one of a numeral, a character, a character string, and a multidimensional vector, and the third party feature quantity is any of a numeral, a character, a character string, and a multidimensional vector.

According to an eleventh aspect of the present invention, provided is an information processing apparatus comprising: an image acquisition module for acquiring an image; a first party feature quantity extracting module for extracting at least one first party feature quantity for describing a first party feature of the image from the acquired image; and a third party interface, comprising: a third party feature quantity extracting module for invoking a third party algorithm to extract from the image at least one third party feature quantity for describing a third party feature other than the first party feature of the image; and a linker for using the link information for describing the correlation between each of the first party feature quantities and each of the third party feature quantities of the same image to correlate each of the first party feature quantities of the image and each of the third party feature quantities.

According to the information processing apparatus as described above, by means of the integration (or access) of the third party algorithm into the video surveillance system, the function which cannot be achieved by the built-in algorithm of the surveillance system can be achieved. Thus, the surveillance system can extract not only the first party features extractable by the built-in algorithm of the surveillance system but also the third party features by the third party algorithm. In this way, the system can analyze more features, thereby expanding the use of video surveillance system and enhancing the flexibility of video management.

In the twelfth aspect of the present invention, the information processing apparatus according to the eleventh aspect is characterized in that the linker is configured to: assign a unique identifier for each of the first party feature quantities to the first party feature quantity; assign a unique identifier for each of the third party feature quantities to the third party feature quantity; record each of the unique identifiers of the first party feature quantities as link information into other first party feature quantities and other third party feature quantities; record each of the unique identifiers of the third party feature quantities as link information into other third party feature quantities and the first party feature quantities; and correlate each of the first party feature quantities of the image and each of the third party feature quantities using the link information consisting of the unique identifiers.

In the thirteenth aspect of the present invention, the information processing apparatus according to the eleventh aspect is characterized by further comprising: a retrieval step of retrieving the at least one first party feature quantity or the at least one third party feature quantity based on a user's retrieval condition and returning the retrieval result to the user.

In this way, it is possible to retrieve the first party feature quantity and the third party feature quantity, and thus the retrieval is conducted with more feature quantities, thereby improving the retrieval accuracy of the video surveillance system.

In the fourteenth aspect of the present invention, the information processing apparatus according to the thirteenth aspect is characterized in that the retrieval module is configured to: when the retrieval condition targets for a first party feature quantity, retrieve the first party feature quantity to obtain a retrieval result of a first party feature described by the first party feature quantity; search for corresponding third party feature quantities and corresponding first party feature quantities other than the first feature quantity for which the retrieval condition targets, using the link information; and return, to the user, the retrieval result of a first party feature described by the first party feature quantity, along with information on third party feature described by each of the third party feature quantity and information on first party feature described by the first party feature quantities other than the first feature quantity for which the retrieval condition targets.

In the fifteenth aspect of the present invention, the information processing apparatus according to the thirteenth aspect is characterized in that the retrieval module is configured to: when the retrieval condition targets for a third party feature quantity, retrieve the third party feature quantity to obtain a retrieval result of a third party feature described by the third party feature quantity; search for corresponding first party feature quantities and corresponding third party feature quantities other than the third feature quantity for which the retrieval condition targets, using the link information; and return, to the user, the retrieval result of a third party feature described by the third party feature quantity, along with information on first party feature described by each of the first party feature quantity and information on third party feature described by the third party feature quantities other than the third feature quantity for which the retrieval condition targets.

In this way, when the search is performed, the retrieved result is returned to the user together with the information of the corresponding related feature found by the link information, thereby further improving the accuracy of the video retrieval and improving the flexibility of the video management.

In the sixteenth aspect of the present invention, the information processing apparatus according to any one of the eleventh to fifteenth aspects is characterized in that the operation mode of the information processing apparatus includes a tight coupling mode and a loose coupling mode.

In the seventeenth aspect of the present invention, the information processing apparatus according to the sixteenth aspect is characterized in that in the tight coupling mode, the third party algorithm is integrated within the third party interface.

In the eighteenth aspect of the present invention, the information processing apparatus according to the sixteenth aspect is characterized in that, in the loose coupling mode, the third party feature extracting module invokes the third party algorithm from outside of the information processing apparatus.

As mentioned above, the tight coupling mode is used to cope with cases where the third party algorithm is completely authorized and is able to be integrated into a third party algorithm interface. For example, when a third party algorithm is fully authorized for use, the image analysis can be performed within the video surveillance system; The loose coupling mode is used to cope with cases where the third party algorithm is not completely authorized and thus, the image has to be transferred to the third party algorithm over the network or the like for analysis and then, the returned third party feature is received. For example, when the third party algorithm is provided as a service to be invoked by the user by accessing it over network, the image analysis is performed outside the video surveillance system. In this way, the video surveillance system can cope with different cases of the third party algorithm separately.

In the nineteenth aspect of the present invention, the information processing apparatus according to any one of the eleventh to fifteenth aspects is characterized by further comprising: the third party interface further comprises: a first party feature quantity registration module for registering each of the first party feature quantities into a first party feature library; a third party feature quantity registration module for registering each of the third party feature quantities into a third party feature library.

In this way, the flexibility of registration management can be improved by registering the first party feature quantity and the third party feature quantity separately into the first party registration library and the third party registration library.

In a twentieth aspect of the present invention, the information processing apparatus according to the nineteenth aspect is characterized in that the first party feature quantity registration and the third party feature quantity registration includes an online registration mode and an offline registration mode.

Herein, the online registration mode is used to cope with the real time access of the image data and the offline mode is used to cope with the case where the history image data is imported by offline upload. Accordingly, it is possible to not only extract the feature quantity from the image and register it in real time, but also to extract the feature quantity and register by uploading the image offline. Therefore, the video surveillance system can deal with real time monitoring, off line analysis and other needs of different situations.

In the twenty first aspect of the present invention, the information processing apparatus according to the nineteenth aspect is characterized in that when each of the third party feature quantities are registered to the third party feature library, each of the third party feature quantities is stored in the third party feature library in a manner of hierarchically clustering approximate feature quantities.

In this way, the third party feature quantities are not arranged in the order of being registered in the storage space, but are arranged in a similarity degree between the feature quantities to form a set of approximate feature quantities. The center vector of the each set of the approximate feature quantities is stored in the first layer storage, When a new feature quantity is registered into the storage space or compared with the feature quantity in the storage space, the most approximate center vector of the set of the approximate feature quantities is searched in the first layer storage and the approximate feature quantity is then searched while entering the corresponding set of feature sets in the second layer. In this way, most of the comparison with a non similar feature vector can be excluded, thereby increasing the retrieval speed.

In a twenty second aspect of the present invention, the information processing apparatus according to any one of the eleventh to fifteenth aspects is characterized in that the third party interface further comprises: a feature quantity format convertor of converting the format of each of the third party feature quantities obtained by the third party algorithm into a format compatible with the format of each of the first party feature quantities.

In this way, the extracted third party feature quantity is compatible with the first party feature quantity in format, thereby facilitating the unified management of the feature quantity.

According to a twenty third aspect of the present invention, provided is a video surveillance system comprising the information processing apparatus according to any one of the eleventh to fifteenth aspects.

According to the video surveillance system as described above, by means of the integration (or access) of the third party algorithm into the video surveillance system, the function which cannot be achieved by the built-in algorithm of the surveillance system can be achieved. Thus, the surveillance system can extract not only the first party features extractable by the built-in algorithm of the surveillance system but also the third party features by the third party algorithm. In this way, the system can analyze more features, thereby expanding the use of video surveillance system and enhancing the flexibility of video management.

According to an embodiment of the present invention, the video surveillance system of the present invention is an intelligent video surveillance system including the information processing apparatus of the present invention. The intelligent video surveillance system of the present invention includes different functional modules and feature libraries and a third party image analysis technology or feature quantity extracted by the technology can be integrated into the intelligent video surveillance system. The third party interface of the information processing apparatus of the present invention includes four operation modes, that is, a tight coupling mode in the online mode, a tight coupling mode in the off line mode, a loose coupling mode in the online mode and a loose coupling mode in the off line mode, to cope with the situations of online/offline operation of the intelligent video surveillance system and whether third party algorithm is able to be integrated into the intelligent video surveillance system. Herein, the online mode is used to cope with cases where a camera accesses in real time and the offline mode is used to cope with cases where the historical video data (such as video files, video tapes, etc.) is loaded. In addition, the tight coupling mode is used to cope with cases where the third party algorithm is completely authorized and is able to be integrated into a third party algorithm interface. For example, when a third party algorithm is fully authorized for use, the image analysis can be performed within the video surveillance system; The loose coupling mode is used to cope with cases where the third party algorithm is not completely authorized and thus, the image has to be transferred to the third party algorithm over the network or the like for analysis and then, the returned third party feature is received. For example, when the third party algorithm is provided as a service to be invoked by the user by accessing it over network, the image analysis is performed outside the video surveillance system. The third party interface has a feature quantity format converter that converts the third party feature quantities in different formats into feature quantities that are compatible with and storable in the system. Meanwhile, the third party interface has a linker that correlates the first party feature quantity (the first party feature quantity) of the same target and the third party feature quantity with one another and can invoke each other. For example, for the same target person, the third party interface correlates the face as the first party feature with other third party features such as "age 30", "gender female", "wearing sunglasses", and the like. When the user looks up the facial features of the target person, the features of "age 30, gender female, wearing sunglasses" are also displayed at the same time; when retrieval is performed using conditions such as "age 30, gender female", the target person's facial features also appear in the retrieval results.

The built-in algorithm (referred to as the first party algorithm) of the intelligent video surveillance system of the present invention utilizes the Adaboost algorithm to extract the sub area of the person's face or the front of the vehicle from the image, and then, the extracted sub area obtains, by the local edge pattern comparison and generating color space histogram, a high dimensional vector (300 1000 dimensions), which is compressed by Principal Component Analysis (PCA) to obtain a 200 dimensional vector feature quantity. The system determines the degree of similarity by a similarity relationship between different facial feature quantities or the front of vehicle feature quantities (Euclidean distance, etc.).

In the present invention, the third party algorithm may be, for example, an algorithm for recognizing a gender and age with a person's facial feature, such as a Support Vector Machine (SVM). Firstly, the face of a person in the image is extracted by Adaboost or other methods. After fragmenting the extracted facial sub region, a feature vector is obtained by histogram of Oriented Gradient (HOG). The feature vector can be classified by the trained Support Vector Machine algorithm and feature quantities of sex and age are obtained.

Another example of the third party algorithm is the algorithm for identifying the vehicle's license plate. Firstly, the license plate area in the image is extracted by morphological features, etc. a high dimensional vector is obtained from the extracted license plate sub region through the trained Convolutional Neural Networks. The license plate characters can be identified by a Softmax classifier from the high dimensional vector.

In practice, a third party algorithm provided by a third party may not be in pubic, and only a input and output interface is generally provided. The third party algorithm is treated as a black box for the intelligent video surveillance system. The input of the third party algorithm is generally an image and the output is a feature quantity including numerals, characters, strings, vectors and the like in different formats.

Effect of the Invention

The information processing method, the information processing apparatus and the video surveillance system of the present invention can expand the applicable range of the video surveillance system, improve the retrieval accuracy, and enhance the flexibility of the video content management and the customizability of the retrieval.

DETAILED DESCRIPTION

Figure 1:
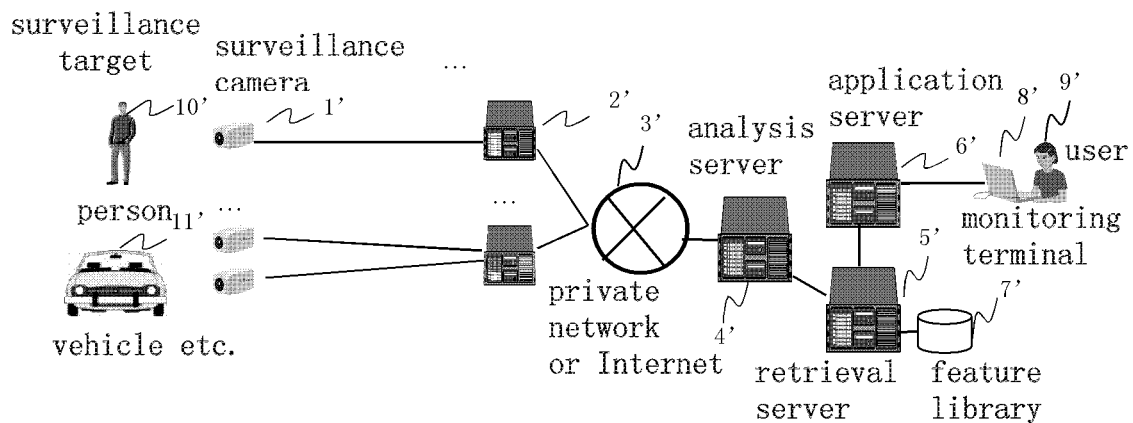
FIG. 1 shows the structure of a typical intelligent video surveillance system of the related art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the present invention, the image herein refers to image data such as videos, pictures, static images, dynamic images, and the like. The first party feature refers to a feature which is extractable from the same image by the intelligent video surveillance system by analyzing the image using the built-in algorithm. The third party feature refers to a feature which is not extractable by using the built-in algorithm but by using a third party algorithm. Third party algorithm refers to an algorithm not installed in the intelligent video surveillance system (non built-in algorithm). The first party feature quantity is a feature quantity that describes a first party feature. The third party feature quantity is a feature that describes a third party feature. The link information refers to information for describing the correlation between each of the first party feature quantities and the third party feature quantities of the same image, e.g., identifiers for other feature quantities recorded in the first party or third party feature quantities as described hereinafter. The identifier for each feature quantity is unique. The identifier may be a numeral. As used herein, "correlating a first party feature quantity and a third party feature quantity of the same image" includes correlating one first party feature quantity of the same image with one third party feature quantity of the image; correlating a plurality of first party feature quantities of the same image with one another; correlating a plurality of third party feature quantities of the same image with one another; correlating a plurality of first party feature quantities of the same image with a plurality of third party feature quantities of the image; and the like.

The video surveillance system of the present invention is, for example, an intelligent video surveillance system including the information processing apparatus of the present invention. The intelligent video surveillance system of the present invention includes different functional modules and feature libraries and a third party image analysis technology or feature quantity extracted by the technology can be integrated into the intelligent video surveillance system. The third party interface of the information processing apparatus of the present invention includes four operation modes, that is, a tight coupling mode in the online mode, a tight coupling mode in the off line mode, a loose coupling mode in the online mode and a loose coupling mode in the off line mode, to cope with the situations of online/offline operation of the intelligent video surveillance system and whether third party algorithm is able to be integrated into the intelligent video surveillance system. Herein, the online mode is used to cope with cases where a camera accesses in real time and the offline mode is used to cope with cases where the historical video data (such as video files, video tapes, etc.) is loaded. In addition, the tight coupling mode is used to cope with cases where the third party algorithm is completely authorized and is able to be integrated into a third party algorithm interface. For example, when a third party algorithm is fully authorized for use, the image analysis can be performed within the video surveillance system; The loose coupling mode is used to cope with cases where the third party algorithm is not completely authorized and thus, the image has to be transferred to the third party algorithm over the network or the like for analysis and then, the returned third party feature is received. For example, when the third party algorithm is provided as a service to be invoked by the user by accessing it over network, the image analysis is performed outside the video surveillance system. The third party interface has a feature quantity format converter that converts the third party feature quantities in different formats into feature quantities that are compatible with and storable in the system. Meanwhile, the third party interface has a linker that correlates the first party feature quantity (the first party feature quantity) of the same target and the third party feature quantity with one another and can invoke each other. For example, for the same target person, the third party interface correlates the face as the first party feature with other third party features such as "age 30", "gender female", "wearing sunglasses", and the like. When the user looks up the facial features of the target person, the features of "age 30, gender female, wearing sunglasses" are also displayed at the same time; when retrieval is performed using conditions such as "age 30, gender female", the target person's facial features also appear in the retrieval results.

The built-in algorithm (referred to as the first party algorithm) of the intelligent video surveillance system of the present invention utilizes the Adaboost algorithm to extract the sub area of the person's face or the front of the vehicle from the image, and then, the extracted sub area obtains, by the local edge pattern comparison and generating color space histogram, a high dimensional vector (300-1000 dimensions), which is compressed by Principal Component Analysis (PCA) to obtain a 200 dimensional vector feature quantity. The system determines the degree of similarity by a similarity relationship between different facial feature quantities or the front of vehicle feature quantities (Euclidean distance, etc.).

In the present invention, the third party algorithm may be, for example, an algorithm for recognizing a gender and age with a person's facial feature, such as a Support Vector Machine (SVM). Firstly, the face of a person in the image is extracted by Adaboost or other methods. After fragmenting the extracted facial sub region, a feature vector is obtained by histogram of Oriented Gradient (HOG). The feature vector can be classified by the trained Support Vector Machine algorithm and feature quantities of sex and age are obtained.

Another example of the third party algorithm is the algorithm for identifying the vehicle's license plate. Firstly, the license plate area in the image is extracted by morphological features, etc. a high dimensional vector is obtained from the extracted license plate sub region through the trained Convolutional Neural Networks. The license plate characters can be identified by a Softmax classifier from the high dimensional vector.

In practice, a third party algorithm provided by a third party may not be in pubic, and only a input and output interface is generally provided. The third party algorithm is treated as a black box for the intelligent video surveillance system. The input of the third party algorithm is generally an image and the output is a feature quantity including numerals, characters, strings, vectors and the like in different formats.

In addition, the information processing apparatus of the present invention may be implemented in hardware, firmware, software, or combinations thereof, and may be implemented, for example, in a computer program installed in the intelligent video surveillance system including a processor and a memory. Although the exemplary embodiments describe the use of a plurality of elements, modules, devices, etc. to perform the information processing method of the present invention, it should be understood that the information of the present invention may also be performed by one or more units, modules, devices, and the like.

Moreover, the information processing method of the present invention may be implemented in a non temporary computer readable medium containing executable program instructions executed by a processor or the like. Here, the information processing method of the present invention can be stored in the memory in a form of program instructions, and the corresponding program instructions are executed by the processor to execute the information processing method of the present invention.

Herein, The processor may be a general purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The memory may be a Random Access Memory (RAM), a flash memory, a Read Only Memory (ROM), a Programmable Read Only Memory (PROM), an Erasable PROM (EPROM), registers, a hard disk, a removable disk, a CD ROM, a DVD, or any other suitable storage device used for storing information, a computer program, and/or instructions to be executed by the processor. They memory may store code that creates an execution environment for one or more computer programs used to implement technology described herein.

A computer program does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 500, and according to any method well known to those of skill in the art. The term "computer readable media" includes computer storage media. For example, computer storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non volatile memory (e.g., random access memory (RAM), read only memory (ROM)).

The video surveillance system of the present invention is, for example, a computer system comprising a plurality of servers, such as a front end server, an analysis server, an application server, a retrieval server, and the like, cameras, monitoring terminals, etc. The information processing apparatus of the present invention may be implemented, for example, as a function module or a computer program distributed in each of the above described servers, monitoring terminals, and the like.

Hereinafter, specific embodiments of the present invention will be described in detail with reference to the accompanying drawings.

In order to enhance the understanding of the present invention, a description will be given of the structure of a typical intelligent video surveillance system and a registration flow of feature quantity. FIG. 1 shows a typical intelligent video surveillance system. In the system architecture of a typical intelligent video surveillance system, the system front end comprises at least one surveillance camera 1' and at least one front end server 2'. The system back end includes an analysis server 4', an application server 6', and a retrieval server 5'. The at least one surveillance camera 1' is connected to the front end server 2'. The front end server 2' is connected to the analysis server 4' through a private network or the Internet. The analysis server 4' and the application server 6' both are connected to the retrieval server 5'. In addition, the application server 6' is also connected to the monitoring terminal 8'. The analysis server 4' and the application server 6' each include an analysis registration module 14' (see FIG. 2). The retrieval server 5' includes a feature library 7' for storing the feature quantity.

The registration mode of the typical intelligent video surveillance system includes two types of online registration mode and offline registration mode.

In the online registration process, the front end server 2' performs video codec, transcoding, and the like, and transmits the image to the analysis server 4' through the private network or the Internet 3'. The analysis server 4' analyzes the image and extracts the feature quantity of the feature (e.g., the face of the person 10' or the front portion of the vehicle 11') and registers it in the feature library 7' of the retrieval server 5'.

In the offline registration process, the user 9' can connect the application server 6' through the monitoring terminal 8' to the search server 5' for offline upload of the video content.

In the comparison process, the user 9' can connect to the application server 6' through the monitoring terminal 8' and perform video search and video management by uploading an image or a retrieval condition.

Figure 2:
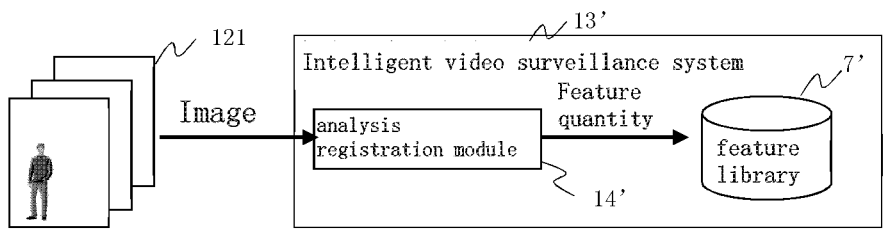
FIG. 2 shows a general flow of registration of feature quantities in a typical intelligent video surveillance system of the related art.

FIG. 2 shows a general flow of the registration of the feature quantities into a typical intelligent video surveillance system. The image 12' captured by the surveillance camera 1' or uploaded by the user 9' offline is transferred to the analysis server 4' or the application server 6' and then, is analyzed by the analysis registration module 14' of the analysis server 4' or the application server 6'. After analysis, the analysis registration module 14' extracts the feature quantity and registers it into the feature library 7'.

Next, a general flow of image analysis using a third party algorithm will be described with reference to FIG. 3.

Figure 3:
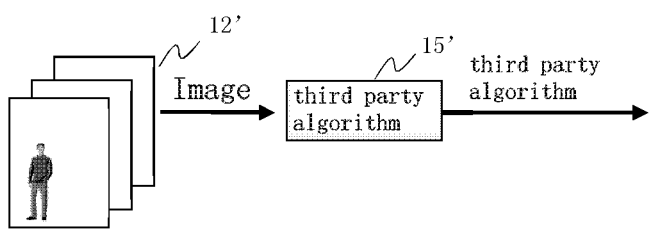
FIG. 3 shows the general flow of image analysis by a third party algorithm.

FIG. 3 shows the general flow of image analysis for third party algorithms. After the image 12' is transferred to the third party algorithm 15' for image analysis, the third party feature quantity is extracted for use by other devices.

Next, the main configuration of the information processing apparatus of the present invention will be described in detail with reference to FIG. 4.

Figure 4:
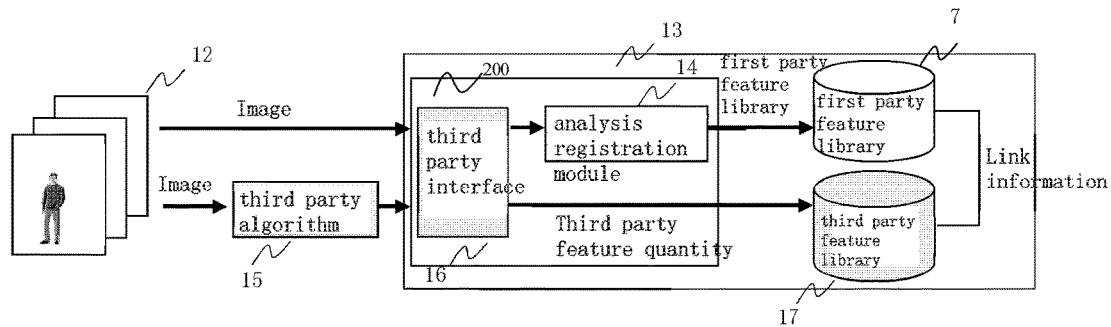
FIG. 4 shows the main structure of the information processing apparatus according to the present invention.

FIG. 4 shows the main configuration of the information processing apparatus proposed by the present invention. The intelligent video surveillance system 13 of the present invention will be described before describing the configuration of the information processing apparatus of the present invention. Although it is not shown, the intelligent video surveillance system 13 using the information processing method and the information processing apparatus of the present invention in FIG. 4 is the same as the typical intelligent video surveillance system shown in FIG. 1. In other words, the system front end includes at least one surveillance camera 1 and at least one front end server 2. The system back end includes an analysis server 4, an application server 6, and a retrieval server 5. The at least one surveillance camera 1 is connected to the front end server 2. The front end server 2 is connected to the analysis server 4 through a private network or the Internet. Both of the analysis server 4 and the application server 6 are connected to the retrieval server 5. In addition, the application server 6 is also connected to the monitoring terminal 8. The analysis server 4 and the application server 6 each includes an analysis registration module 14. The retrieval server 5 includes a first party feature library 7 for storing a feature quantity.

The main difference between the intelligent video surveillance system 13 of the present invention and the typical intelligent video surveillance system 13' is that the intelligent video surveillance system 13 of the present invention includes the information processing apparatus 200 of the present invention. The intelligent video surveillance system 13 of the present invention further includes a third party feature library 17 for registering a third party feature quantity to be described later.

The information processing apparatus 200 of the present invention may be implemented by hardware or software. For example, the information processing apparatus 200 of the present invention may be implemented by software installed in the analysis server 4, the application server 6, or the retrieval server 5 of the information processing apparatus 200 of the present invention.

The information processing apparatus 200 of the present invention includes an image acquisition module (not shown), an analysis registration module 14 (an example of a first party feature quantity extracting module), and a third party interface 16. In the present embodiment, the analysis registration module 14 has the functions of the first party feature quantity extracting module and the first party feature quantity registration module. The image acquisition module may be a functional module that receives an image that is captured by the surveillance camera 1 or an image uploaded by the user 9 and transfers it to other function modules of the information processing apparatus 200 (e.g., an analysis registration module 14, 27, 28, etc.). The analysis registration module 14, like the analysis registration module 14' of the typical intelligent video surveillance system 13', can extract the first party feature quantity using the built-in algorithm of the system. The third party interface 16 may invoke a third party algorithm 15. The third party algorithm 15 may be an algorithm that analyzes the image and extracts the feature quantity that can not be analyzed by the built-in algorithm of the intelligent video surveillance system. The third party algorithm 15 may be customized according to the image information processing requirements. The third party interface 16 includes an analysis registration module 27 or 28 (an example of a third party feature extracting module) and a linker 29 (see FIGS. 7, 8, 9, and the like) described later. In the present embodiment, the analysis registration module 27 or 28 functions as a third party feature quantity extracting module and a third party feature quantity registration module. The information processing apparatus 200 of the present invention may further include a search module 32, 33, and a feature quantity format converter 31, which will be described later. In the present invention, the third party algorithm 15 may be installed independently exterior to the information processing apparatus of the present invention or may be integrated into the third party interface 16, as will be described later.

On one hand, the third party interface 16 can transmit the image 12 captured by the surveillance camera 1 or uploaded by the user 9 offline to the analysis registration module 14 (first party feature analysis registration module) of the information processing device 200 to extract the feature quantity that can be extracted by the built-in algorithm of the intelligent video surveillance system, that is, the first party feature quantity. On the other hand, the third party interface 16 can transfer the third party feature quantity obtained by analysis with the third party algorithm 15 to the third party feature library 17 for storage and the first party feature quantity of the first party feature library 7 (first party feature library) is correlated with the format converted third party feature that is extracted by the third party algorithm. Specifically, on one hand, the image 12 captured by the surveillance camera 1 or uploaded by the user 9 offline is transferred to the third party interface 16 and is then transferred to the first party feature analysis registration module 14, and after analysis by the module 14, the feature vector is registered to the first party feature library 7. On the other hand, the image 12 captured by the surveillance camera 1 or uploaded by the user 9 offline is transferred to the third party algorithm 15, and the third party feature extracted by analyzing and processing the image by the third party algorithm 15 is transmitted to the third party interface 16. After the third party interface 16 receives the third party feature quantity, the third party feature quantity is registered in the third party feature library 17 after some necessary processing such as the feature format conversion. There is link information between the first party feature library 7 and the third party feature library 17 so that the first party feature quantity in the first party feature store 7 is correlated with the third party feature quantity in the third party feature library 17. In this case, the third party feature library 17 receives the format converted feature quantity for storage.

Figure 5:
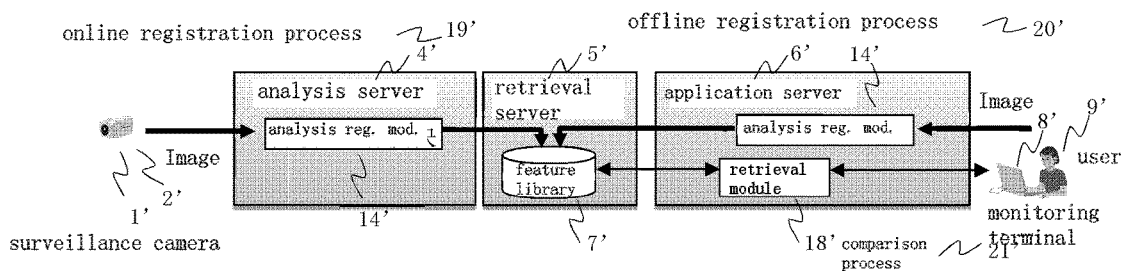
FIG. 5 shows a general flow of online registration, offline registration, and comparison of a typical intelligent video surveillance system of the related art.

Next, for a better understanding of the present invention, reference will be made to a general operation of a typical intelligent video surveillance system of the related art with reference to FIG. 5. FIG. 5 shows a general flow of online registration, offline registration and comparison of a typical intelligent video surveillance system. In order to complete the retrieval, the typical intelligent video surveillance system 13' has to perform a registration process of analyzing the feature quantity and registering it into the feature library, and an comparison process 21' for comparing the feature quantity of the image to be retrieved with the feature quantity in the feature library, Herein, the registration flow is divided into an online registration process 19' and an offline registration flow 20' according to whether to process the image in real time. The online registration process 19' processes the real time image from the surveillance camera 1, and the offline registration flow 20' processes the historical video and images uploaded by the user 9' via the application server 6' through the monitoring terminal 8'. In the online registration process 19', the image uploaded by the surveillance camera 1' or uploaded by the user 9' is transferred into the analysis registration module 14' of the analysis server 4', and then the feature quantity is extracted and registered in the feature library 7' of the retrieval server 5'. In the offline registration process 20', the image uploaded by the surveillance camera 1' or uploaded by the user 9' is transferred to the analysis registration module 14' of the application server 6', and then the feature quantity is extracted and registered in the feature library 7' of the retrieval server 5'. In the comparison process 21', the user 9' initiates at the monitoring terminal 8' a comparison command to the search module 18' of the application server 6', and the retrieval module 18' performs the feature quantity comparison in the feature library 7' of the retrieval server 5' and returns the retrieval result to the monitoring terminal 8'.

Next, the operation principle of the intelligent video surveillance system using the information processing method and the information processing apparatus of the present invention will be described in detail. Here, the differences between the present invention and the related art will be mainly discussed.

Figure 6:
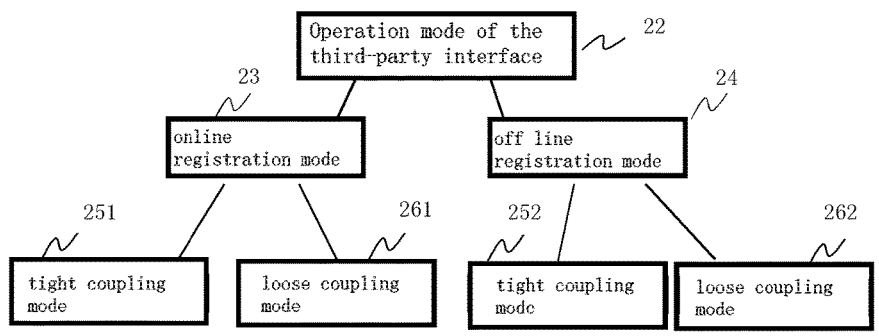
FIG. 6 shows the operation mode of the third party interface proposed by the present invention.

FIG. 6 shows the operation mode of the third party interface proposed by the present invention. According to the registration flow of the feature quantity of the intelligent video surveillance system according to the present invention, the operation mode 22 of the third party interface proposed by the present invention is divided into the online registration mode 23 and the offline registration mode 24. The operation mode 22 of the third party interface proposed by the present invention is divided into tight coupling modes 251 and 252 and loose coupling patterns 261 and 262 according to the coupling relationship between the third party algorithm and the third party interface. The tight coupling mode 251, 252 represents that the third party algorithm 15 is integrated into the third party interface 16 of the present invention, where the extraction of the third party feature quantity is also done in the third party interface; the loose coupling mode 26 represents that the third party algorithm 15 is exterior to the intelligent video surveillance system 13 of the present invention, where the extraction of the third party feature quantity is performed outside the intelligent video surveillance system 13 of the present invention. Thus, the third party interface 16 proposed by the present invention has four different modes of operation to cope with different situations.

Hereinafter, each of the operation modes of the intelligent video surveillance system using the information processing method and the information processing apparatus of the present invention will be described in detail.

Figure 7:
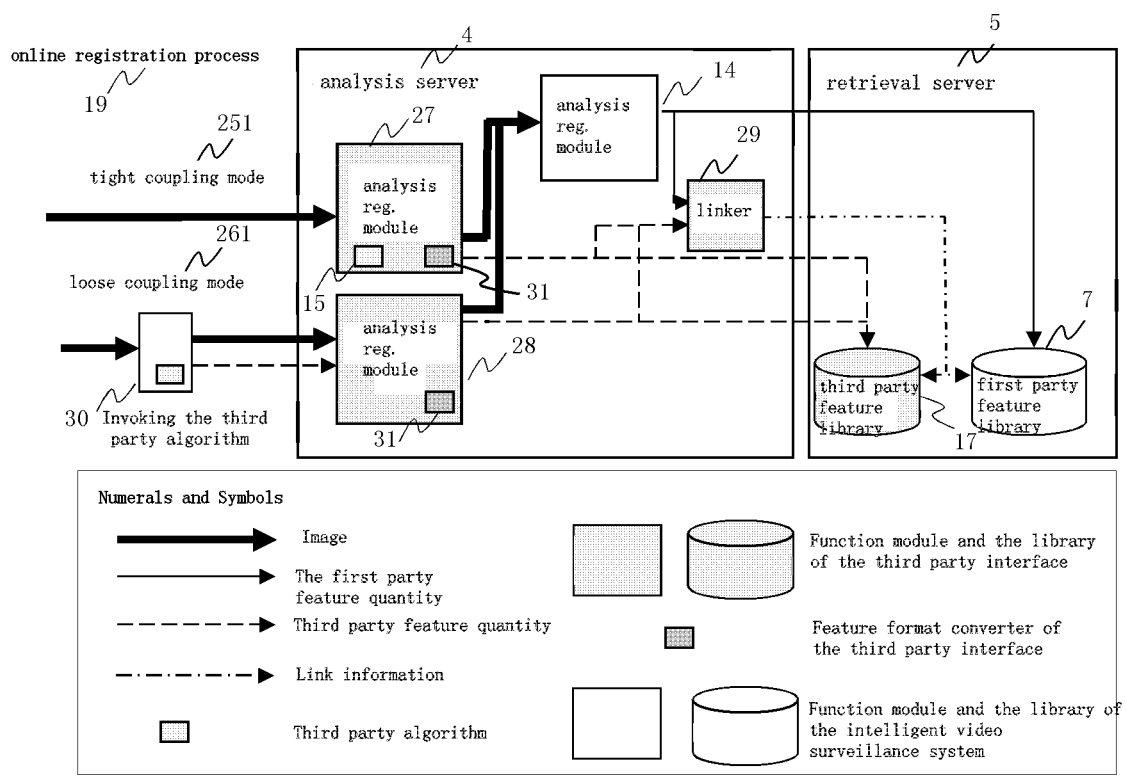
FIG. 7 shows an online registration flow of the intelligent video surveillance system using the information processing method and the information processing apparatus of the present invention.

FIG. 7 shows an online registration process of the intelligent video surveillance system using the information processing method and the information processing apparatus of the present invention, wherein each server position corresponds to that in FIG. 5.

In the online registration process 19, when the third party interface operates in the tight coupling mode 251, the image captured by the surveillance camera 1 is transmitted to the analysis registration module 27 of the analysis server 4 in the tight coupling mode. On one hand, the analysis registration module 27 transfers the image to the first party feature analysis registration module 14 and the first party feature quantity extracted by analyzing the image by the module 14 is registered into the first party feature library 7 of the retrieval server 5. On the other hand, the analysis registration module 27 invokes its internal third party algorithm 15 to analyze and extract the third party feature quantity and, after format converting the third party feature quantity through the feature quantity format converter 31 within the analysis registration module 27, the format converted third party feature quantity is registered to the third party feature library 17 of the retrieval server 5. Here, the feature quantity format converter 31 is a means for converting the format to enable the format of the third party feature quantity analyzed and extracted by the third party algorithm 15 compatible with that of the first party. Meanwhile, the linker 29 correlates the first party feature quantity of the same image with the third party feature quantity using the link information and link them within the third party feature library 7 and the third party feature library 17.

Furthermore, in the online registration process 19, when the third party interface operates in the loose coupling mode 261, the third party algorithm 15 is invoked 30 outside the system, and the image captured by the camera 1 and the third party feature quantity of the image analyzed and extracted by the third party algorithm 15 are simultaneously transmitted to the analysis registration module 28 of the analysis server 4 in the loose coupling mode. On one hand, the analysis registration module 28 transfers the image to the first party feature analysis registration module 14 and the first party feature quantity extracted by analyzing the image by the module 14 is registered into the first party feature library 7 of the retrieval server 5. On the other hand, the third party feature quantity is registered in the third party feature library 17 of the retrieval server 5 after being format converted by the feature quantity format converter 31 of the analysis registration module 28, and. Meanwhile, the linker 29 correlates the first party feature quantity of the same image with the third party feature quantity using the link information and link them within the third party feature library 7 and the third party feature library 17.

Figure 8:
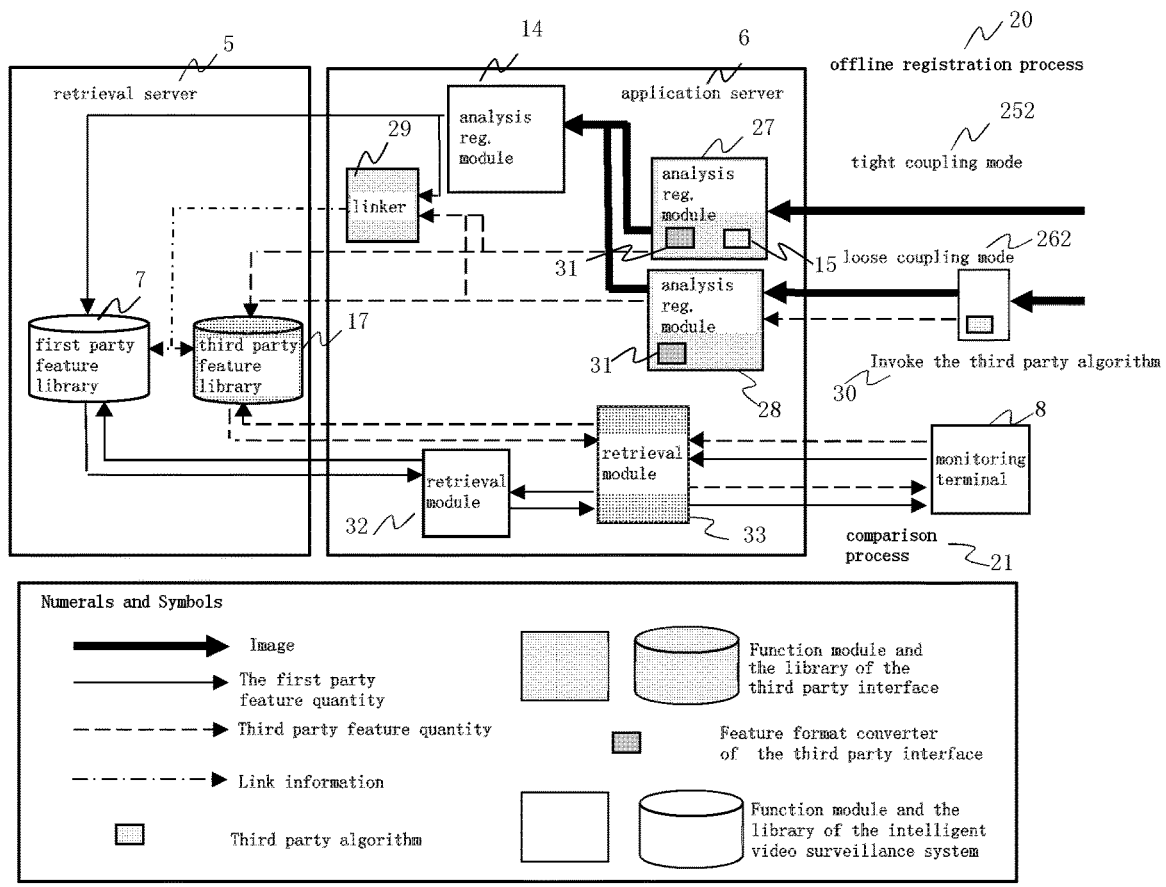
FIG. 8 shows an off line registration flow and an comparison flow of the intelligent video surveillance system using the information processing method and the information processing apparatus of the present invention.

FIG. 8 shows an offline registration process and an comparison process of the intelligent video surveillance system using the information processing method and the information processing apparatus of the present invention, wherein each server position corresponds to that in FIG. 5.

In the offline registration process 20, when the third party interface operates in the tight coupling mode 252, the image uploaded by the user 9 is transmitted to the analysis registration module 27 of the application server 6 in the tight coupling mode. On one hand, the analysis registration module 27 transfers the image to the first party feature analysis registration module 14 and the first party feature quantity extracted by analyzing the image by the module 14 is registered into the first party feature library 7 of the retrieval server 5. On the other hand, the analysis registration module 27 invokes its internal third party algorithm 15 to analyze and extract the third party feature quantity and, after format converting the third party feature quantity through the feature quantity format converter 31 within the analysis registration module 27, the format converted third party feature quantity is registered to the third party feature library 17 of the retrieval server 5. Meanwhile, the linker 29 correlates the first party feature quantity of the same image with the third party feature quantity using the link information and link them within the third party feature library 7 and the third party feature library 17.

In addition, in the offline registration process 20, when the third party interface operates in the loose coupling mode 262, the third party algorithm 15 is invoked 30 outside the system, and the image uploaded by the user 9 and the third party feature quantity of the image analyzed and extracted by the third party algorithm 15 are simultaneously transmitted to the analysis registration module 28 of the analysis server 4 in the loose coupling mode. On one hand, the analysis registration module 28 transfers the image to the first party feature analysis registration module 14 and the first party feature quantity extracted by analyzing the image by the module 14 is registered into the first party feature library 7 of the retrieval server 5. On the other hand, the third party feature quantity is registered in the third party feature library 17 of the retrieval server 5 after being format converted by the feature quantity format converter 31 of the analysis registration module 28, and. Meanwhile, the linker 29 correlates the first party feature quantity of the same image with the third party feature quantity using the link information and link them within the third party feature library 7 and the third party feature library 17.

In the comparison process, the user 9 uploads, via the retrieval terminal, the image to be retrieved or retrieval condition to the retrieval module 33 of the third party interface and the original retrieval module 32 in the application server 6 to perform comparison in the third party feature library 17 or the first party feature library 7, and returns the retrieval result and link information. The correlation result in the third party feature library 17 or the first party feature library 7 is found by using the link information, and is returned to the monitoring terminal 8. The monitoring terminal 8 presents the result to the user 9.

As described above, according to the information processing apparatus and the video surveillance system including the information processing apparatus of the present invention, by means of the integration (or access) of the third party algorithm into the video surveillance system, the function which cannot be achieved by the built-in algorithm of the surveillance system can be achieved. Thus, the surveillance system can extract not only the first party features extractable by the built-in algorithm of the surveillance system but also the third party features by the third party algorithm. In this way, the system can analyze more features, thereby expanding the use of video surveillance system and enhancing the flexibility of video management.

Next, the function of the feature quantity converter of the third party interface proposed by the present invention will be described.

Figure 9:
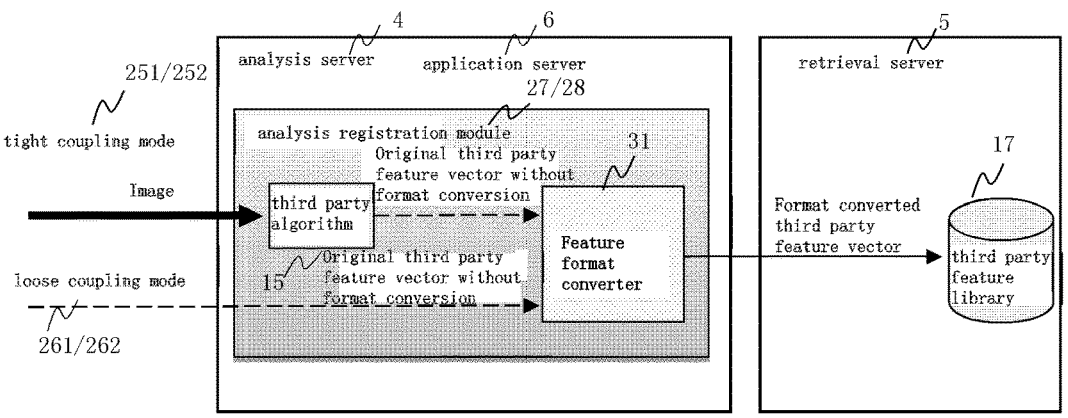
FIG. 9 shows the function of the feature quantity converter in the third party interface proposed by the present invention.

FIG. 9 shows the function of the feature quantity converter of the third party interface proposed by the present invention. In the tight coupling modes 251 and 252, the image captured by the surveillance camera 1 or uploaded by the user 9 is transmitted to the analysis registration module 27 of the analysis server 4 or the application server 6 in the tight coupling mode, and the third party feature quantity is extracted after being analyzed by the third party algorithm 15. Then, the third party feature quantity is processed by the feature quantity format converter 31 to obtain a format converted third party feature quantity. In the loose coupling modes 261 and 262, the third party feature quantity analyzed outside the system is transmitted to the analysis registration module 28 of the analysis server 4 or the application server 6 in the loose coupling mode, and the third party feature quantity is processed by the feature quantity format converter 31 to obtain a format converted third party feature quantity. The format converted third party feature quantity is registered in the third party feature library of the retrieval server 5. [In each of the above described operation modes, the feature quantity format converter 31 format converts the third party feature quantity so that the format converted third party feature quantity is compatible with the first party feature quantity in format. Of course, when the third party feature quantity without format conversion is compatible with the first party feature quantity, it is not necessary to format convert the third party feature quantity, and the format conversion process may be omitted.

Hereinafter, an example of the first party feature quantity, a third party feature quantity without format conversion and a format converted third party feature quantity in the present embodiment will be described in detail.

Figure 10:
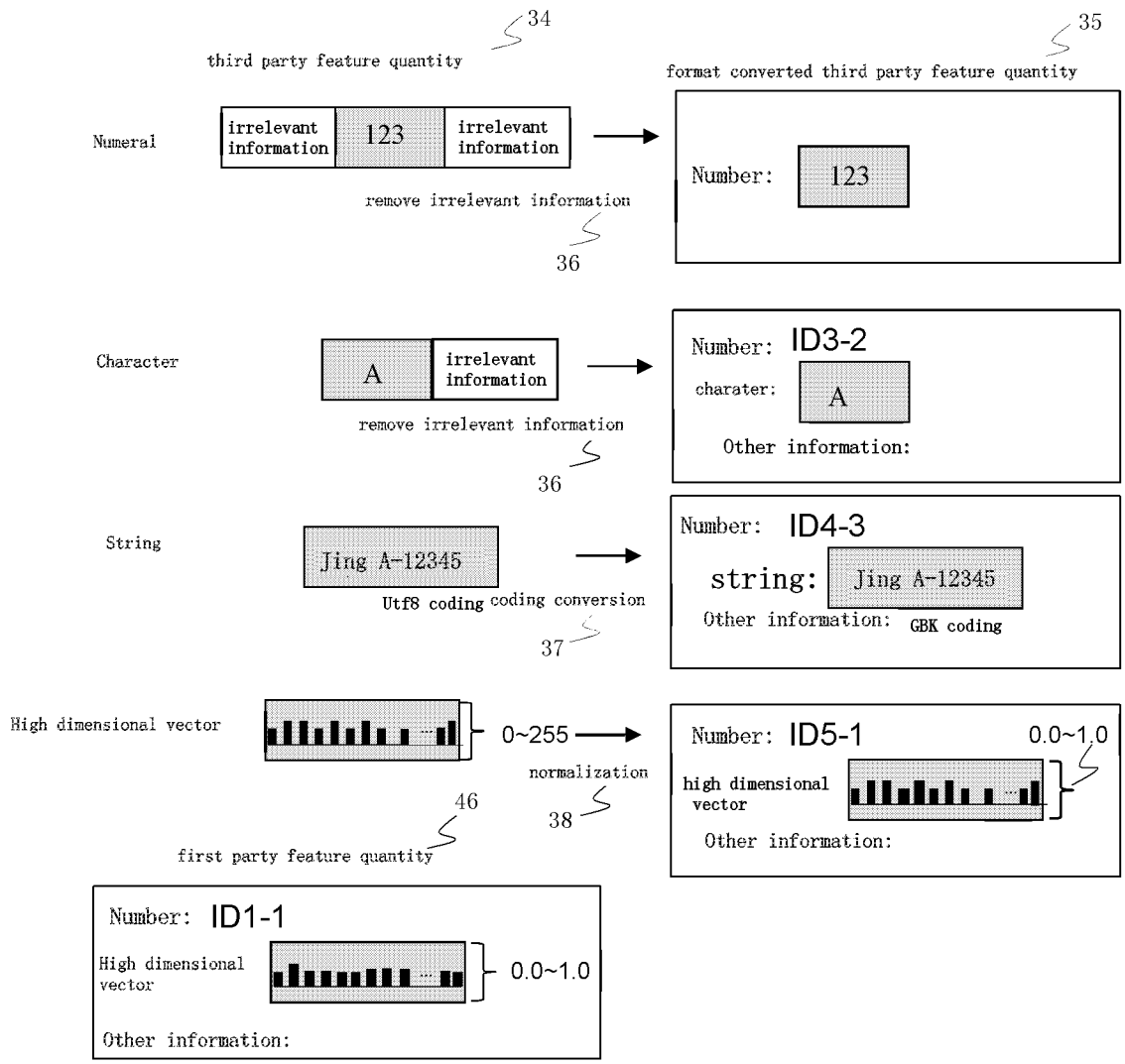
FIG. 10 shows an example of a first party feature quantity, a third party feature quantity whose format is not converted and a format converted third party feature quantity of the present embodiment.

FIG. 10 shows an example of the first party feature quantity, a third party feature quantity without format conversion and a format converted third party feature quantity in the present embodiment. The third party feature 34 may be in the form of numerals, characters, strings, multidimensional vectors, and the like. The first party feature quantity 46 may also be in the form of a numeral, a character, a character string, a multidimensional vector, and the like. For example, in the intelligent video surveillance system 13 using the information processing method and the information processing apparatus of the present invention, the first party feature quantity is a high dimensional vector 46 that characterizes the face or the front of a vehicle. When a third party feature quantity extracted by the third party algorithm without format conversion has irrelevant information not required by intelligent video surveillance system (such as the numeral given by the third party algorithm), the irrelevant information will be removed. When the coding format of the third party feature quantity extracted by the third party algorithm without format conversion is different from that of the intelligent video surveillance system, the coding will be converted. When the value range of the third party feature quantity extracted by the third party algorithm without format conversion is different from that of the intelligent video surveillance system, normalization 38 and other conversion operations will be performed. After that, the third party feature quantity will be assigned for a unique number in the intelligent video surveillance system, and other information (such as image capture time, location, etc.) will be added to the third party feature quantity, thereby forming a format converted third party feature quantity 35.

Figure 11:
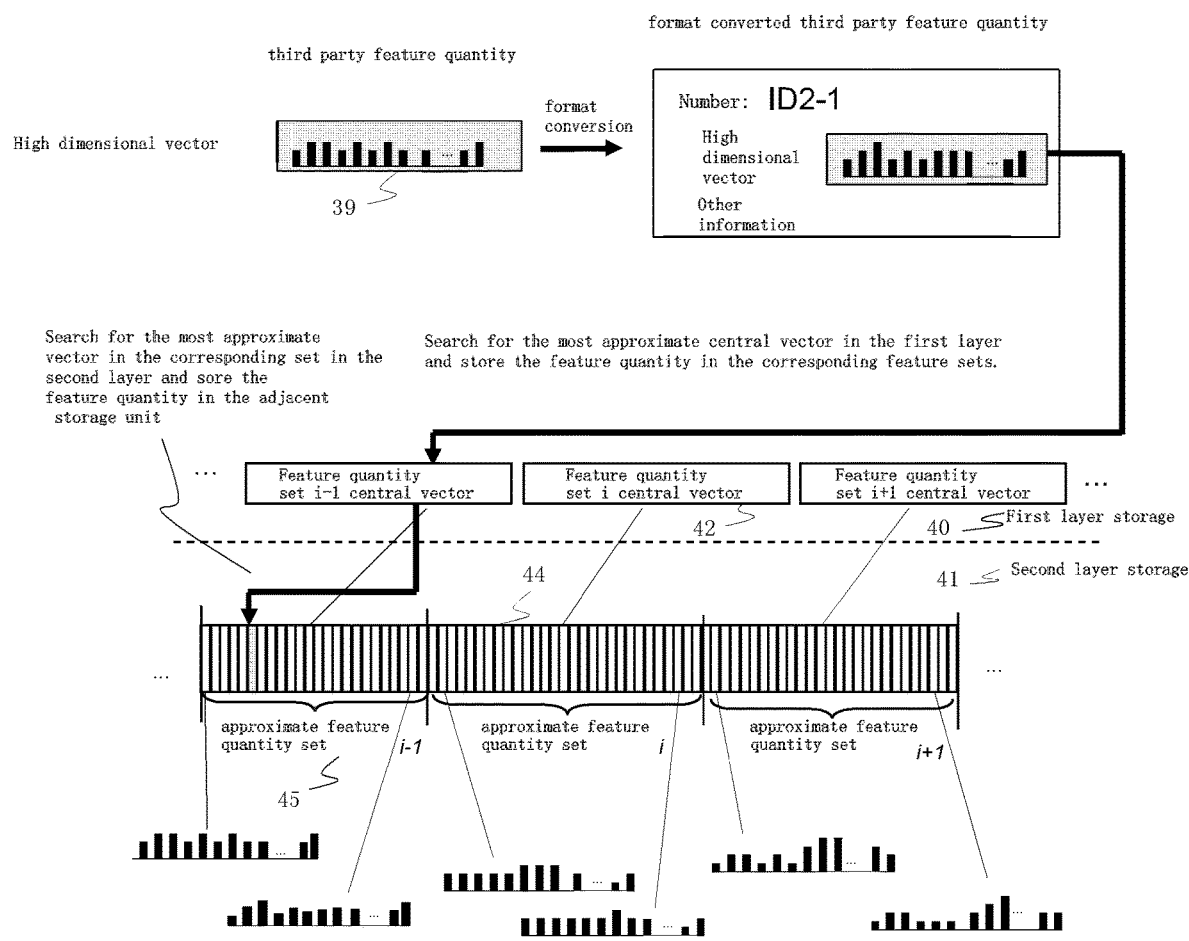
FIG. 11 shows a form in which the third party feature quantity is stored in the storage space after the feature format converter of the third party interface proposed by the present invention converts the format of the third party feature quantity into a format that can be stored by the system.

FIG. 11 shows a form in which the third party feature quantity is stored in the storage space after the feature format converter of the third party interface proposed by the present invention converts the format of the third party feature quantity into a format that can be stored by the system. When the third party feature quantity is a multidimensional vector 39, the third party feature quantity needs to be stored in the storage of the intelligent video surveillance system of the present invention in a specific form after format conversion. Of course, when the third party feature quantity without format conversion is compatible with the first party feature quantity, the format conversion process may be omitted. The intelligent video surveillance system of the present invention has a hierarchical storage structure in order to enable to quickly find the desired feature quantity in the massive data. In the second layer 41, the feature quantities 44 are not arranged in the order of registration in the storage space, but are arranged in a similarity degree between the feature quantities to form a set 45 of approximate feature quantities; in the first layer storage 40, central vectors 42 of each set of approximate feature quantities are stored. When a new feature quantity is registered in the storage space or compared with the feature quantity in the storage space, the center vector of the most approximate set of feature quantities is first found in the first layer storage, and then, the approximate feature quantity in the set of feature quantity is searched in the second layer. This form can exclude most of the comparison of the non-approximate feature vectors, increasing the retrieval speed. The format converted third party feature is stored in the storage space in such a clustering and hierarchical form.

Next, the correlation process of the first party feature quantity and the third party feature quantity achieved by the linker in the third party interface of the present invention will be described in detail.

Figure 12:
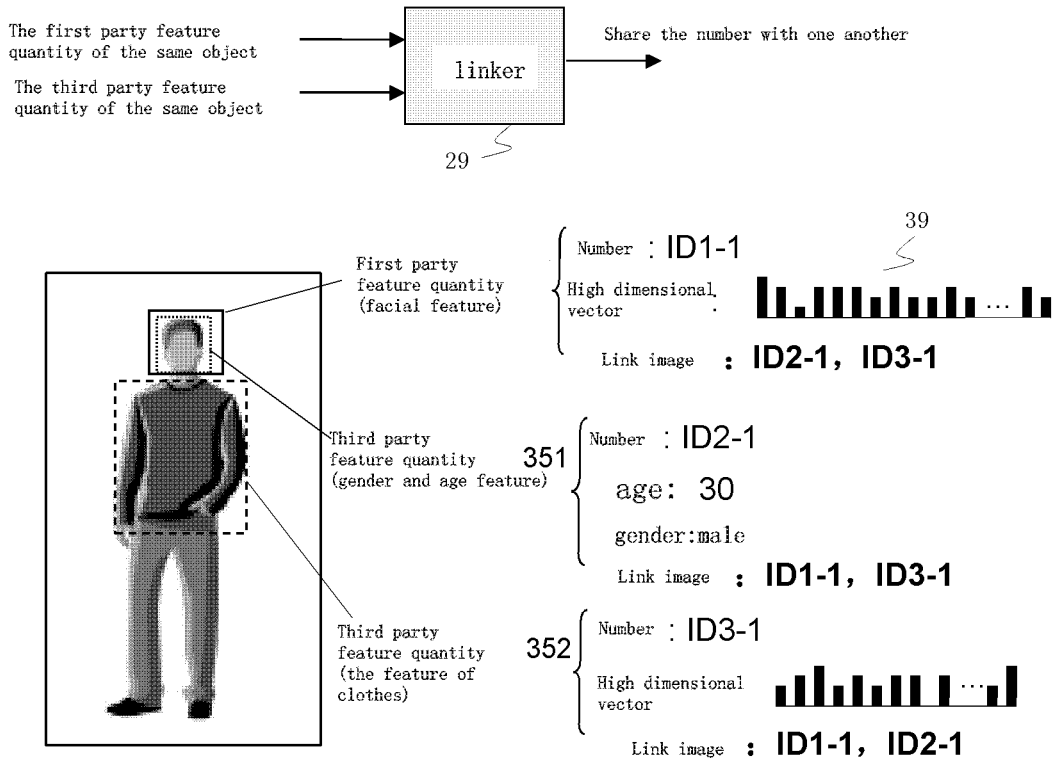
FIG. 12 shows an example of the function of the linker and the link information in the third party interface proposed by the present invention.

FIG. 12 shows an example of the function of the linker and the link information in the third party interface proposed by the present invention. The link information refers to information for describing the correlation between the first party feature quantity and the third party feature quantity of the same image. For example, in the present embodiment, the link information is a number (an example of the identifier) that correlates the first party feature quantity and a third party feature quantity of the same image, that is, the number (an example of the identifier) of other first party feature quantities or other third party feature quantities recorded in a first party feature quantity or a third party feature quantity, The number of each feature quantity is unique.

After the first party feature quantity is extracted by the analysis registration module 14, the linker 29 assigns a unique number (an example of an identifier), for example, ID1 1 in FIG. 12, to the first party feature quantity. After the third party feature quantity is extracted by the analysis registration module 27/28, the linker 29 assigns a unique number (an example of an identifier), such as the number ID2-1, ID3-1 in FIG. 12, to each third party feature quantity. For the same image or the same target (e.g., the same person), the linker 29 records, in a first party feature quantity and a third party feature quantity, the number (identifier) of other first party feature quantity and other third party feature quantity and shares the number as link information, that is, the number of other feature quantity, for example, a third party feature quantity, is recorded in the present feature quantity (for example, a first party feature quantity) as the link information of these other feature quantities, and the link information of these other feature quantities is used to correlate the present feature quantity with other feature quantities. In this way, a first party feature quantity of the same image is correlated with the third party feature quantity or the different third party feature quantities of the same image are correlated with each other.

For example, as shown in FIG. 12, for the same person, the link information (i.e. The number of the third party feature quantity 351 recorded in the first party feature quantity, for example, ID2-1) of the third party feature quantity 351 and the link information of the third party feature quantity 352 (i.e., the number of the third party feature quantity 352 recorded in the first party feature quantity, for example, ID3-1) are recorded in the first party feature quantity (describing the first party feature, for example, the feature quantity describing the facial feature) of the person. When a first party feature quantity describing a facial feature is invoked, if it is desired to further query the gender and age feature or the feature of clothes of the person as third party feature, the corresponding third party feature quantity 351 describing the gender and age feature and the corresponding third party feature quantity 352 describing the feature of the clothes can be searched, simply by using the link information, such as ID2-1 and ID3-1, of the third party feature quantities 351 and 352, which is recorded in the first party quantity, thereby determining the gender and age feature and the feature of clothes of the person.

Similarly, as shown in FIG. 12, the link information (i.e. the number of the first party feature quantity recorded in the third party feature quantity 351, for example, ID1-1) of the first party quantity and the link information of the third party feature quantity 352 (i.e., the number of the third party feature quantity 352 recorded in the first party feature quantity, for example, ID3-1) are recorded in the third party feature quantity 351 (describing the third party feature, for example, the feature quantity describing the gender and age feature) of the person. When a third party feature quantity 351 describing the gender and age feature is invoked, if it is desired to further query the facial feature as first party feature or the feature of clothes of the person as third party feature, the corresponding first party feature quantity describing the facial feature and the corresponding third party feature quantity 352 describing the feature of the clothes can be searched, simply by using the link information, such as ID1-1 and ID3-1, of the first party feature quantity and the third party feature quantity 352, which is recorded in the third party quantity 351, thereby determining the facial feature and the feature of clothes of the person for the same person, Similarly, as shown in FIG. 12, the link information (i.e. the number of the first party feature quantity recorded in the third party feature quantity 352, for example, ID1-1) of the first party quantity and the link information of the third party feature quantity 351 (i.e., the number of the third party feature quantity 351 recorded in the third party feature quantity, for example, ID2-1) are recorded in the third party feature quantity 352 (describing the third party feature, for example, the feature quantity describing the feature of clothes) of the person. When a third party feature quantity 352 describing the feature of clothes is invoked, if it is desired to further query the facial feature as first party feature or the gender and age feature of the person as third party feature, the corresponding first party feature quantity describing the facial feature and the corresponding third party feature quantity 351 describing the gender and age feature can be searched, simply by using the link information, such as ID1-1 and ID2-1, of the first party feature quantity and the third party feature quantity 351, which is recorded in the third party quantity 352, thereby determining the facial feature and the gender and age feature of the person for the same person, Hereinafter, the information processing method of the present invention will be described in detail with reference to a flowchart.

Figure 13:
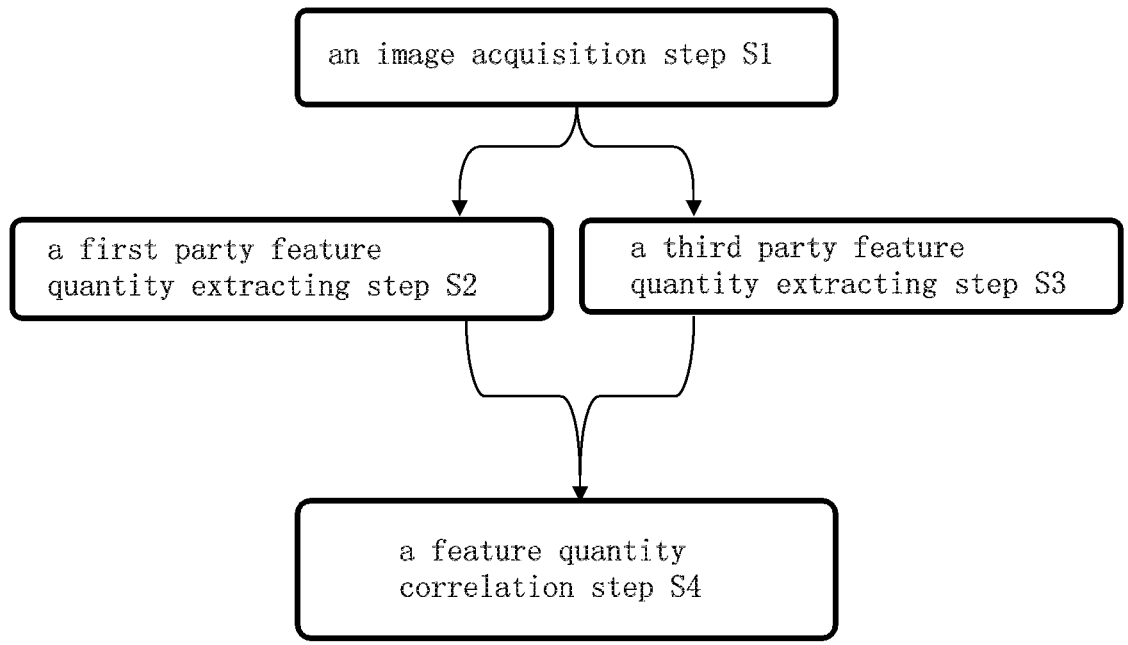
FIG. 13 shows a schematic flow chart of the information processing method of the present invention.

FIG. 13 is a schematic flowchart of an information processing method according to the present invention.

The information processing method of the present invention includes an image acquisition step (S1) of acquiring an image; a first party feature quantity extracting step (S2) of extracting at least one first party feature quantity for describing a first party feature of the image from the acquired image; a third party feature quantity extracting step (S3) of invoking a third party algorithm to extract from the image at least one third party feature quantity for describing a third party feature other than the first party feature of the image; and a feature quantity correlation step (S4) of using the link information for describing the correlation between each of the first party feature quantities and each of the third party feature quantities of the same image to correlate each of the first party feature quantities of the image and each of the third party feature quantities. Further, the information processing method of the present invention may further include a retrieval step (S5) of retrieving the at least one first party feature quantity or the at least one third party feature quantity based on a user's retrieval condition and returning the retrieval result to the user. The information processing method of the present invention may further include a first party feature quantity registration step (S6) of registering the first party feature quantity and a third party feature quantity registration step (S7) of registering the third party feature quantity. The first party feature quantity registration step and the third party feature quantity registration step may include an online registration mode and an offline registration mode. Further, the information processing method of the present invention may further include a feature quantity format conversion step (step S8) of converting the format of each of the third party feature quantities obtained by the third party algorithm into a format compatible with the format of each of the first party feature quantities.

Hereinafter, with reference to FIGS. 14 to 17, the online registration process, the offline registration process, and the comparison flow of the intelligent video surveillance system of the present invention using the information processing method and the information processing apparatus of the present invention will be described in detail.

Figure 14:
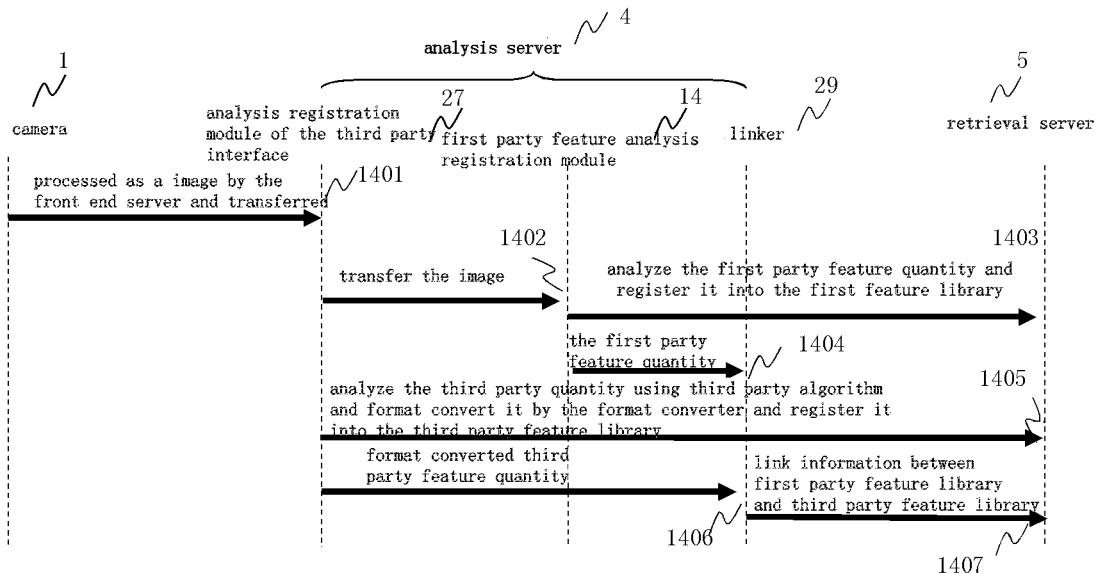
FIG. 14 shows an on line registration flow of the intelligent video surveillance system in the tight coupling mode using the information processing method and the information processing apparatus of the present invention.

FIG. 14 shows an online registration process of the system in the tight coupling mode using the information processing method and the information processing apparatus of the present invention, which corresponds to FIG. 7. When the third party interface operates in the tight coupling mode, the video acquired by the surveillance camera 1 is processed as an image through the front end server 2, and the image is transferred to the analysis registration module 27 of the analysis server 4 in the tight coupling mode (step 1401) (an example of S1). On one hand, the image is transferred to the first party feature quantity registration analysis module 14 (step 1402), and the analyzed first party feature quantity is registered in the first party feature library 7 of the retrieval server 5 (step 1403) (an example of S2 and S6). Meanwhile, the first party feature analysis registration module 14 transmits the extracted first party feature quantity to the linker 29 (step 1404). On the other hand, the analysis registration module 27 of the third party interface analyzes and extracts the third party feature quantity (an example of step S3) using the third party algorithm 15 and transfers it to the feature quantity format converter 31 for format conversion (an example of S8), and registers the formatted third party feature quantity in the third party feature library 17 of the retrieval server 5 (step 1405) (an example of step S7). Meanwhile, the analysis registration module 27 of the third party interface also transmits the analyzed third party feature quantity to the linker 29 (step 1406), and the linker 29 uses the link information to correlate the first party feature quantity and the third party feature quantity and form linkage between the third party feature library 17 and the first party feature library 7 of the retrieval server 5 (step 1407) (an example of step S4).

Figure 15:
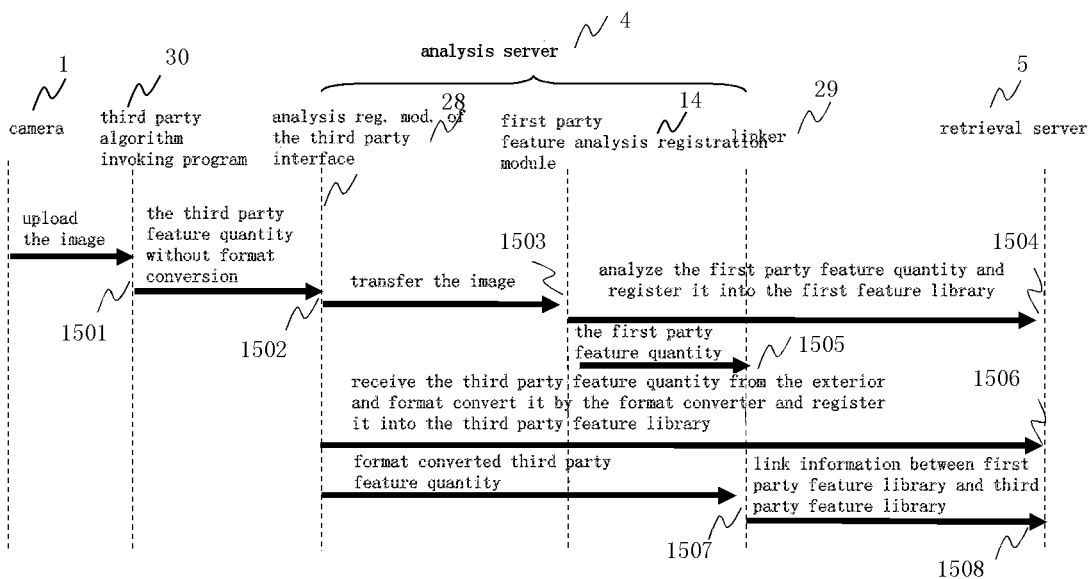
FIG. 15 shows an on line registration flow of the intelligent video surveillance system in the loose coupling mode using the information processing method and the information processing apparatus of the present invention.

FIG. 15 shows an online registration process of the system in the loose coupling mode using the information processing method and the information processing apparatus of the present invention, which corresponds to FIG. 7. When the third party interface is in the loose coupling mode, the video acquired by the surveillance camera 1 is processed as an image through the front end server 2, and the image is transferred to the third party algorithm invoking program 30 exterior to the system (step 1501) (an example of step S1). The program extracts the third party feature quantity (an example of step S3) without format conversion, and then the image together with the unconverted third party feature quantity is transferred to the analysis registration module 28 of the analysis server 4 in the loose coupling mode (step 1502). On one hand, the image is transferred to the first party feature quantity registration analysis module 14 (step 1503) for analysis and then, the analyzed first party feature quantity is registered in the first party feature library 7 of the retrieval server 5 (step 1504) (examples of steps S2 and S6). Meanwhile, the first party feature analysis registration module 14 transmits the extracted first party feature quantity to the linker 29 (step 1505). On the other hand, the analysis registration module 28 of the third party interface transmits the third party feature quantity of the unconverted format directly to the feature quantity format converter 31 for format conversion (an example of step S8), and the format converted third party feature quantity is registered in the third party feature library 17 of the retrieval server 5 (step 1506) (an example of step S7). Meanwhile, the analysis registration module 28 of the third party interface also transmits the format converted third party feature quantity to the linker 29 (step 1507), and the linker 29 uses the link information to correlate the first party feature quantity and the third party feature quantity and form linkage between the first party feature library 17 and the first party feature library 7 of the retrieval server 5 (step 1508) (an example of step S4).

Figure 16:
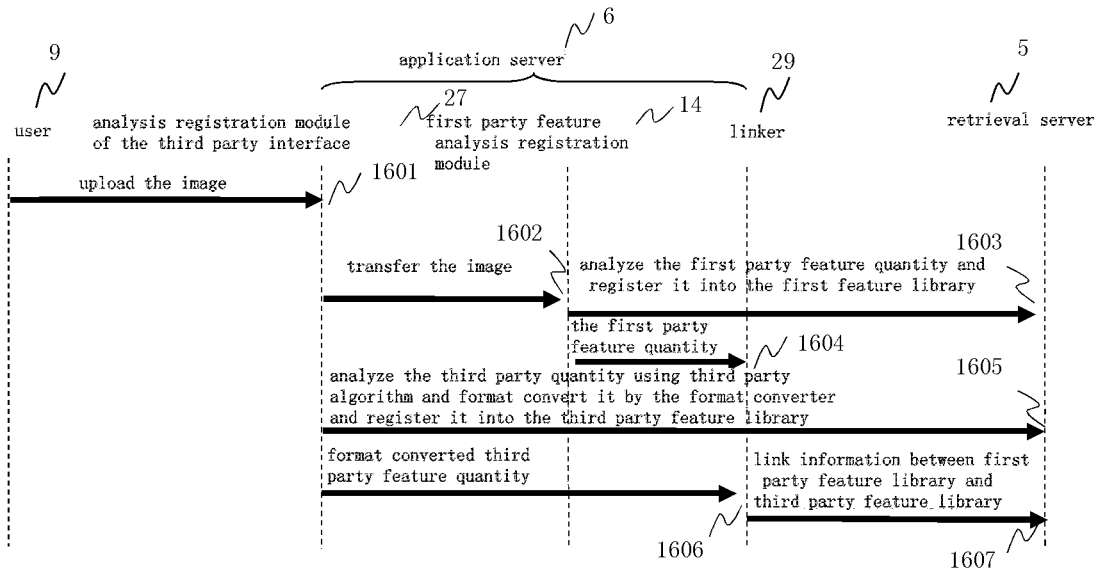
FIG. 16 shows an off line registration flow of the intelligent video surveillance system in the tight coupling mode using the information processing method and the information processing apparatus of the present invention.

FIG. 16 shows an offline registration process of the system in the tight coupling mode using the information processing method and the information processing apparatus of the present invention, which corresponds to FIG. 8. When the third party interface operates in the tight coupling mode, the image uploaded by the user 9 is transferred to the analysis registration module 27 of the application server 6 in the tight coupling mode (step 1601) (an example of S1). On one hand, the image is transferred to the first party feature quantity registration analysis module 14 (step 1602), and the analyzed first party feature quantity is registered in the first party feature library 7 of the retrieval server 5 (step 1603) (an example of S2 and S6). Meanwhile, the first party feature analysis registration module 14 transmits the extracted first party feature quantity to the linker 29 (step 1604). On the other hand, the analysis registration module 27 of the third party interface analyzes and extracts the third party feature quantity (an example of step S3) using the third party algorithm 15 and transfers it to the feature quantity format converter 31 for format conversion (an example of S8), and registers the formatted third party feature quantity in the third party feature library 17 of the retrieval server 5 (step 1605) (an example of step S7). Meanwhile, the analysis registration module 27 of the third party interface also transmits the analyzed third party feature quantity to the linker 29 (step 1606), and the linker 29 uses the link information to correlate the first party feature quantity and the third party feature quantity and form linkage between the third party feature library 17 and the first party feature library 7 of the retrieval server 5 (step 1607) (an example of step S4).

Figure 17:
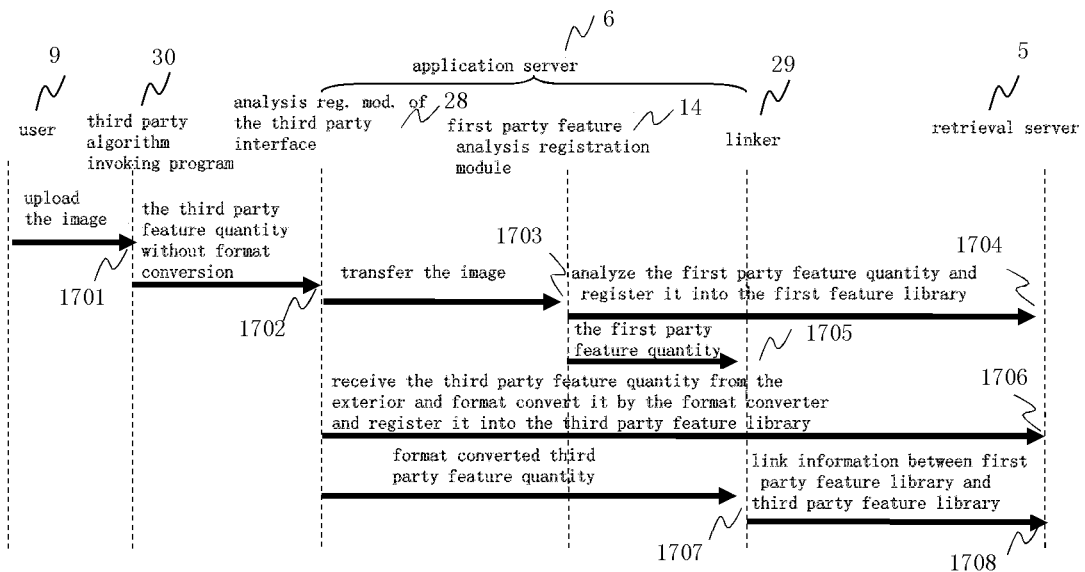
FIG. 17 shows an off line registration flow of the intelligent video surveillance system in the loose coupling mode using the information processing method and the information processing apparatus of the present invention.

FIG. 17 shows an offline registration process of the system in the loose coupling mode using the information processing method and the information processing apparatus of the present invention, which corresponds to FIG. 7. When the third party interface is in the loose coupling mode, the image uploaded by the user 9 is transferred to the third party algorithm invoking program 30 exterior to the system, (step 1701) (an example of step S1). The program extracts the third party feature quantity (an example of step S3) without format conversion, and then the image together with the unconverted third party feature quantity is transferred to the analysis registration module 28 of the application server 6 in the loose coupling mode (step 1202). On one hand, the image is transferred to the first party feature quantity registration analysis module 14 (step 1703) for analysis and then, the analyzed first party feature quantity is registered in the first party feature library 7 of the retrieval server 5 (step 1704) (examples of steps S2 and S6). Meanwhile, the first party feature analysis registration module 14 transmits the extracted first party feature quantity to the linker 29 (step 1705). On the other hand, the analysis registration module 28 of the third party interface transmits the third party feature quantity of the unconverted format directly to the feature quantity format converter 31 for format conversion (an example of step S8), and the format converted third party feature quantity is registered in the third party feature library 17 of the retrieval server 5 (step 1706) (an example of step S7). Meanwhile, the analysis registration module 28 of the third party interface also transmits the format converted third party feature quantity to the linker 29 (step 1707), and the linker 29 uses the link information to correlate the first party feature quantity and the third party feature quantity and form linkage between the first party feature library 17 and the first party feature library 7 of the retrieval server 5 (step 1708) (an example of step S4).

Figure 18:
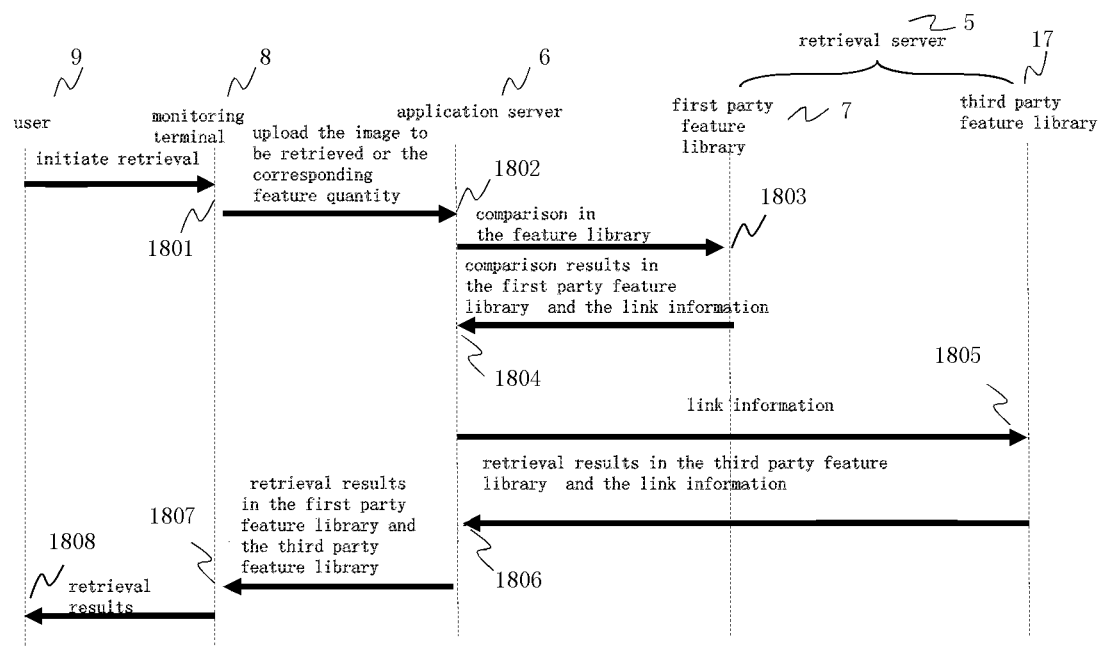
FIG. 18 shows a comparison flow of the intelligent video surveillance system using the information processing method and the information processing apparatus of the present invention.

FIG. 18 shows a comparison process of the intelligent video surveillance system using the information processing method and the information processing apparatus of the present invention, which corresponds to FIG. 8 (an example of step S5). First, the user 9 initiates a retrieval command to the monitoring terminal 8 (step 1801) and uploads the image to be retrieved or the corresponding first party feature quantity or the third party feature quantity (i.e., the retrieval condition) through the monitoring terminal 8 (step 1802). For example, when the uploaded retrieval condition relates to the first party feature quantity in the first party feature library 7, the retrieval module 33 of the third party interface in the application server 6 make comparison in the first party feature library of the system by invoking the first party feature retrieval module 32 (Step 1803), and then the comparison result and the link information are returned to the retrieval module 33 of the third party interface (step 1804). The third party interface retrieval module 33 searches for the corresponding third party feature quantity in the third party feature library 17 using the link information (step 1805), and the result of the corresponding third party feature quantity is returned to the retrieval module 33 of the third party interface (step 1806), The retrieval module 33 of the third party interface returns the search result in the first party feature library 7 and the third party feature library 17 to the monitoring terminal 8 (step 1807), and the user 9 can view the result through the monitoring terminal 8 (step 1808).

Although not shown, the retrieval module 33 of the third party interface in the application server 6 similarly performs the comparison in the third party feature library 17 when the user uploaded retrieval condition refers to the third party feature quantity in the third party feature library 17. After comparison, the comparison result and the link information are returned to the third party interface of the retrieval module 33. The retrieval module 33 of the third party interface uses the link information to search for the corresponding first party feature quantity in the first party feature library 7 by invoking the first party feature retrieval module 32, and the result of the corresponding first party feature quantity is returned to the retrieval module 33 of the third party interface through the first party feature retrieval module 32, and the retrieval module 33 of the third party interface returns the search result in the first party feature library 7 and the third party feature library 17 to the monitoring terminal 8. As such, the user 9 can view the results through the monitoring terminal 8.

As described above, according to the information processing method and the video surveillance system using the information processing method, by means of the integration (or access) of the third party algorithm into the video surveillance system, the function which cannot be achieved by the built-in algorithm of the surveillance system can be achieved. Thus, the surveillance system can extract not only the first party features extractable by the built-in algorithm of the surveillance system but also the third party features by the third party algorithm. In this way, the system can analyze more features, thereby expanding the use of video surveillance system and enhancing the flexibility of video management.

Hereinafter, application examples of the intelligent video surveillance system using the information processing method and the information processing apparatus of the present invention will be described.

Figure 19:
FIG. 19 shows an application example of the information processing apparatus according to the present invention.

FIG. 19 shows an application example of the information processing apparatus according to the present invention. For example, as shown in the upper left diagram of FIG. 19, for example, some of the related art intelligent video surveillance systems can only monitor the facial features using the built-in algorithm, i.e., the feature quantity extractable by the video surveillance system through analysis is a facial feature. The intelligent video surveillance system of the present invention using the information processing method and the information processing device of the present invention, which is realized by a third party interface according to the present invention in combination with the system, can analyze the age, gender, whether to wear glasses, etc. from image using third party algorithm, that is, can extract third party feature quantity (e.g., the age, gender, whether to wear glasses), in addition to extracting facial features using the built-in algorithm of the intelligent video surveillance system of the present invention. As such, the same person can not only be described with facial features, but also with age, gender, whether to wear glasses and other third party features, that is describe the same person with more features described, thereby improving the accuracy of the retrieval and increasing the flexibility of video content management.

For example, as shown in the upper right diagram of FIG. 19, for example, some of the related art intelligent video surveillance systems can only monitor features of the front of a vehicle using the built-in algorithm, i.e., the feature quantity extractable by the video surveillance system through analysis is features of the front of a vehicle. The intelligent video surveillance system of the present invention using the information processing method and the information processing device of the present invention, which is realized by a third party interface according to the present invention in combination with the system, can analyze the license plate, vehicle color, vehicle trademark etc. from image using third party algorithm, that is, can extract third party feature quantity (e.g., the license plate, vehicle color, vehicle trademark), in addition to extracting features of the front of a vehicle using the built-in algorithm of the intelligent video surveillance system of the present invention. As such, the same person can not only be described with facial features, but also with the license plate, vehicle color, vehicle trademark and other third party features, that is describe the same person with more features described, thereby improving the accuracy of the retrieval and increasing the flexibility of video content management.

For example, some of the related art intelligent video surveillance systems can only monitor the facial features using the built-in algorithm, i.e., the feature quantity extractable by the video surveillance system through analysis is a facial feature. The intelligent video surveillance system of the present invention using the information processing method and the information processing device of the present invention, which is realized by a third party interface according to the present invention in combination with the system, can analyze feature of clothes from image using third party algorithm, that is, can extract third party feature quantity (e.g., feature of clothes), in addition to extracting facial features using the built-in algorithm of the intelligent video surveillance system of the present invention. As such, the same person can not only be described with facial features, but also with age, gender, whether to wear glasses and other third party features, that is describe the same person with more features described, thereby improving the accuracy of the retrieval and increasing the flexibility of video content management.

Although, in the present invention, some embodiments and application examples have been described to illustrate the present invention, they are not intended to be limited to the specific embodiments set forth herein. Those skilled in the art will be able to substitute, add, delete, or vary some of the configurations in accordance with the various features of the described embodiments, and it is to be understood that such substitutions, additions, deletions or variations are within the scope of the invention.

INDUSTRIAL PRACTICAL APPLICABILITY

According to the information processing method, the information processing apparatus and the video surveillance system of the present invention, it is possible to expand the applicable range of the video surveillance system, improve the retrieval accuracy, and enhance the flexibility of the video content management, and the customizability of the search, which is applicable for industry.

What is claimed is:

1. An information processing method, comprising:
acquiring an image;
invoking a built-in algorithm to extract one or more first party feature quantities, that describe one or more first party features of the same image, from the same image;
invoking a third party algorithm to extract one or more third party feature quantities, that describe one or more third party features which are different than the first party features of the same image, from the same image; and
correlating the first party feature quantities and the third party feature quantities, the correlating including:
assigning respective unique identifiers to each of the first party feature quantities of the same image,
assigning respective unique identifiers to each of the third party feature quantities of the same image,
storing the first party feature quantities in a first party feature library, each of the first party feature quantities being stored with respective link information which includes respective unique identifiers of each of the third party feature quantities of the same image, and
storing the third party feature quantities in a third party feature library which is different than the first party feature library, each of the third party feature quantities being stored with respective link information which includes respective unique identifiers of each of the first party feature quantities of the same image,
wherein the third party feature quantities are not extractable by using the built-in algorithm.

2. The information processing method according to claim 1, further comprising:
retrieving a first party feature quantity and a third party feature quantity based on a retrieval condition from a user; and
returning a retrieval result to the user.

3. The information processing method according to claim 2, wherein the retrieving includes:
when the retrieval condition describes a first party feature quantity, retrieving at least one first party feature quantity stored in the first party feature library which are described by the first party feature quantity of the retrieval condition,
searching for corresponding third party feature quantities stored in the third party feature library using the link information of the retrieved at least one first party feature quantities, and
returning, to the user, the retrieval result including the retrieved at least one first party feature quantities and the corresponding third party feature quantities.

4. The information processing method according to claim 2, wherein the retrieving includes:
when the retrieval condition describes a third party feature quantity, retrieving at least one third party feature quantity stored in the third party feature library which are described by the third party feature quantity of the retrieval condition,
searching for corresponding first party feature quantities stored in the first party feature library using the link of the retrieved at least one third party feature quantities, and
returning, to the user, the retrieval result including the retrieved at least one third party feature quantities and the corresponding first party feature quantities.

5. The information processing method according to claim 1, wherein the storing of the first party feature quantities and the storing of the third party feature quantities are each performed in an online registration mode and an offline registration mode.

6. The information processing method according to claim 1, wherein:
the third party feature quantities are stored in a manner of hierarchically clustering approximate feature quantities thereof.

7. The information processing method according to claim 1, further comprising:
converting a format of each of the third party feature quantities obtained by the third party algorithm into a format compatible with a format of each of the first party feature quantities.

8. The information processing method according to claim 1, wherein:
each of the first party feature quantities is any one of a numeral, a character, a character string, and a multidimensional vector, and
each of the third party feature quantities is any of a numeral, a character, a character string, and a multidimensional vector.

9. An information processing apparatus comprising:
a processor; and
a memory which stores instructions that, when executed by the processor, cause the processor to perform acts including:
acquiring an image;
invoking a built-in algorithm to extract one or more first party feature quantities, that describe one or more first party features of the same image, from the same image;
invoking a third party algorithm to extract one or more third party feature quantities, that describe one or more third party features which are different than the first party features of the same image, from the same image; and
correlating the first party feature quantities and the third party feature quantities, the correlating including:
assigning respective unique identifiers to each of the first party feature quantities of the same image,
assigning respective unique identifiers to each of the third party feature quantities of the same image,
storing the first party feature quantities in a first party feature library, each of the first party feature quantities being stored with respective link information which includes respective unique identifiers of each of the third party feature quantities of the same image, and
storing the third party feature quantities in a third party feature library which is different than the first party feature library, each of the third party feature quantities being stored with respective link information which includes respective unique identifiers of each of the first party feature quantities of the same image,
wherein the third party feature quantities are not extractable by using the built-in algorithm.

10. The information processing apparatus according to claim 9, wherein the instructions, when executed by the processor, cause the processor to further perform acts including:
retrieving a first party feature quantity and a third party feature quantity based on a retrieval condition from a user; and
returning a retrieval result to the user.

11. The information processing apparatus according to claim 10, wherein the retrieving includes:
when the retrieval condition describes a first party feature quantity, retrieving at least one first party feature quantity stored in the first party feature library which are described by the first party feature quantity of the retrieval condition,
searching for corresponding third party feature quantities stored in the third party feature library using the link information of the retrieved at least one first party feature quantities, and
returning, to the user, the retrieval result including the retrieved at least one first party feature quantities and the corresponding third party feature quantities.

12. The information processing apparatus according to claim 10, wherein the retrieving includes:
when the retrieval condition describes a third party feature quantity, retrieving at least one third party feature quantity stored in the third party feature library which are described by the third party feature quantity of the retrieval condition,
searching for corresponding first party feature quantities stored in the first party feature library using the link of the retrieved at least one third party feature quantities, and
returning, to the user, the retrieval result including the retrieved at least one third party feature quantities and the corresponding first party feature quantities.

13. The information processing apparatus according to claim 9, wherein:
an operation mode of the information processing apparatus includes a tight coupling mode and a loose coupling mode.

14. The information processing apparatus according to claim 13, wherein:
in the tight coupling mode, the third party algorithm is executed by the processor.

15. The information processing apparatus according to claim 13, wherein:
in the loose coupling mode, the third party algorithm is executed outside of the information processing apparatus.

16. The information processing apparatus according to claim 9, wherein:
storing of the first party feature quantities and the storing of the third party feature quantities are each configured to be performed in an online registration mode and an offline registration mode.

17. The information processing apparatus according to claim 9, wherein:
the third party feature quantities are stored in a manner of hierarchically clustering approximate feature quantities thereof.

18. The information processing apparatus according to claim 9, wherein the instructions, when executed by the processor, cause the processor to further perform acts including:
converting a format of each of the third party feature quantities obtained by the third party algorithm into a format compatible with a format of each of the first party feature quantities.

19. The information processing apparatus according to claim 9, wherein:
each of the first party feature quantities is any one of a numeral, a character, a character string, and a multidimensional vector, and
each of the third party feature quantities is any of a numeral, a character, a character string, and a multidimensional vector.

* * * * *